(12) United States Patent
Eng et al.

(10) Patent No.: US 9,338,190 B2
(45) Date of Patent: *May 10, 2016

(54) SYSTEM AND METHOD FOR MANAGING MULTIMEDIA COMMUNICATIONS ACROSS CONVERGENT NETWORKS

(75) Inventors: Chi Eng, Wayne, NJ (US); Steven Heap, Haymarket, VA (US); Alexander Mashinsky, New York, NY (US); Roger Kim, Ashburn, VA (US)

(73) Assignee: AIP ACQUISITION LLC, Fort Lee, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,346

(22) Filed: Jul. 3, 2012

(65) Prior Publication Data

US 2012/0321058 A1 Dec. 20, 2012

Related U.S. Application Data

(63) Continuation of application No. 12/766,691, filed on Apr. 23, 2010, now abandoned, which is a continuation-in-part of application No. 11/042,597, filed on Jan. 24, 2005, now Pat. No. 7,948,875.

(60) Provisional application No. 60/538,320, filed on Jan. 22, 2004.

(30) Foreign Application Priority Data

Oct. 11, 1995 (IL) .......................................... 115580

(51) Int. Cl.
*H04B 14/06* (2006.01)
*H04W 4/00* (2009.01)
(Continued)

(52) U.S. Cl.
CPC .......... *H04L 65/1066* (2013.01); *H04L 43/087* (2013.01); *H04L 43/0829* (2013.01);
(Continued)

(58) Field of Classification Search
CPC ............................................ H04Q 2213/13204
USPC .......................................................... 370/252
See application file for complete search history.

(56) References Cited

U.S. PATENT DOCUMENTS 3,306,984 A 2/1967 Leonard
4,068,101 A 1/1978 Chemarin
(Continued)

FOREIGN PATENT DOCUMENTS

EP 0 501 903 9/1992
EP 0 658 061 6/1995
(Continued)

OTHER PUBLICATIONS

Strazisar, V., "How to Build a Gateway", IEN 109, Bolt Baranek and Newman, Aug. 1979.
(Continued)

*Primary Examiner* — Samina Choudhry
(74) *Attorney, Agent, or Firm* — Lucas & Mercanti, LLP

(57) ABSTRACT

A method and device that interrogates the availability of a called party before placing a communication from the calling party to the called party. A callback may be initiated so that both communications are completed simultaneously. The routing of communication may take place through any one of a number of different networks and at another time of the day, even if the caller does not otherwise have access to those networks.

32 Claims, 24 Drawing Sheets

(51) Int. Cl.
*H04L 12/66* (2006.01)
*H04L 29/06* (2006.01)
*H04L 12/701* (2013.01)
*H04L 12/725* (2013.01)
*H04L 12/26* (2006.01)

(52) U.S. Cl.
CPC ............ *H04L43/0876* (2013.01); *H04L 45/00* (2013.01); *H04L 45/302* (2013.01); *H04L 65/1069* (2013.01); *H04L 65/80* (2013.01)
USPC ............................ 375/252; 370/354; 370/329

(56) References Cited

U.S. PATENT DOCUMENTS

| | | |
|---|---|---|
| 4,166,929 A | 9/1979 | Sheinbein |
| 4,313,035 A | 1/1982 | Jordan et al. |
| 4,313,036 A | 1/1982 | Jabara et al. |
| 4,594,477 A | 6/1986 | Noirot |
| 4,644,351 A * | 2/1987 | Zabarsky et al. ............ 340/7.21 |
| 4,723,238 A | 2/1988 | Isreal et al. |
| 4,782,485 A | 11/1988 | Gollub |
| 5,012,515 A | 4/1991 | McVitie |
| 5,027,387 A | 6/1991 | Moll |
| 5,042,027 A | 8/1991 | Takase et al. |
| 5,051,983 A | 9/1991 | Kammerl |
| 5,068,891 A | 11/1991 | Marshall |
| 5,103,449 A | 4/1992 | Jolissaint |
| 5,163,042 A | 11/1992 | Ochiai |
| 5,187,710 A | 2/1993 | Chau |
| 5,222,120 A | 6/1993 | McLeod et al. |
| 5,247,676 A | 9/1993 | Ozur et al. |
| 5,287,202 A | 2/1994 | Kumarappan |
| 5,311,583 A | 5/1994 | Friedes et al. |
| 5,313,467 A | 5/1994 | Varghese et al. |
| 5,327,486 A | 7/1994 | Wolff et al. |
| 5,337,352 A | 8/1994 | Kobayashi |
| 5,353,331 A | 10/1994 | Emery et al. |
| 5,406,557 A * | 4/1995 | Baudoin ........................ 370/407 |
| 5,408,518 A | 4/1995 | Yunoki |
| 5,408,526 A | 4/1995 | McFarland et al. |
| 5,410,754 A | 4/1995 | Klotzbach |
| 5,412,760 A | 5/1995 | Peitz |
| 5,414,752 A | 5/1995 | Jonsson |
| 5,425,084 A | 6/1995 | Brinskele |
| 5,425,091 A | 6/1995 | Josephs |
| 5,426,643 A | 6/1995 | Smolinske et al. |
| 5,434,854 A | 7/1995 | Focarile et al. |
| 5,438,616 A | 8/1995 | Peoples |
| 5,440,613 A | 8/1995 | Fuentes |
| 5,444,713 A | 8/1995 | Backaus et al. |
| 5,459,722 A | 10/1995 | Sherif |
| 5,479,495 A | 12/1995 | Blumhardt |
| 5,502,752 A | 3/1996 | Averbuch et al. |
| 5,506,887 A | 4/1996 | Emery et al. |
| 5,511,111 A | 4/1996 | Serbetcioglu et al. |
| 5,515,425 A | 5/1996 | Penzias et al. |
| 5,517,564 A | 5/1996 | Slater et al. |
| 5,526,353 A | 6/1996 | Henley |
| 5,526,404 A | 6/1996 | Wiedeman et al. |
| 5,526,413 A | 6/1996 | Cheston, III et al. |
| 5,533,100 A | 7/1996 | Bass et al. |
| 5,534,914 A | 7/1996 | Flohr et al. |
| 5,537,461 A | 7/1996 | Bridges et al. |
| 5,553,063 A | 9/1996 | Dickson |
| 5,553,271 A | 9/1996 | Hile et al. |
| 5,590,181 A | 12/1996 | Hogan et al. |
| 5,604,737 A | 2/1997 | Iwami |
| 5,606,602 A | 2/1997 | Johnson et al. |
| 5,608,782 A | 3/1997 | Carlsen et al. |
| 5,608,786 A | 3/1997 | Gordon |
| H1641 H | 4/1997 | Sharman |
| 5,617,423 A | 4/1997 | Li et al. |
| 5,638,363 A | 6/1997 | Gittins et al. |
| 5,659,542 A | 8/1997 | Bell et al. |
| 5,661,790 A | 8/1997 | Hsu |
| 5,675,636 A | 10/1997 | Gray |
| 5,689,553 A | 11/1997 | Ahuja et al. |
| 5,699,089 A | 12/1997 | Murray |
| 5,706,507 A | 1/1998 | Schloss |
| 5,724,406 A | 3/1998 | Juster |
| 5,726,984 A | 3/1998 | Kubler et al. |
| 5,740,231 A * | 4/1998 | Cohn et al. .................. 379/88.22 |
| 5,742,905 A | 4/1998 | Pepe et al. |
| 5,764,741 A | 6/1998 | Barak |
| 5,771,279 A | 6/1998 | Cheston, III et al. |
| 5,790,642 A | 8/1998 | Taylor et al. |
| 5,825,780 A | 10/1998 | Christie |
| 5,825,858 A | 10/1998 | Shaffer et al. |
| 5,859,984 A | 1/1999 | Blair et al. |
| 5,905,873 A * | 5/1999 | Hartmann et al. ............ 709/249 |
| 5,917,897 A | 6/1999 | Johnson et al. |
| 5,920,562 A | 7/1999 | Christie et al. |
| 5,940,479 A | 8/1999 | Guy et al. |
| 5,953,350 A | 9/1999 | Higgins |
| 5,970,126 A | 10/1999 | Bowater et al. |
| 5,991,301 A * | 11/1999 | Christie ...................... 370/395.3 |
| 5,999,598 A | 12/1999 | Henrick et al. |
| 6,014,378 A | 1/2000 | Christie et al. |
| 6,021,126 A | 2/2000 | White et al. |
| 6,026,091 A | 2/2000 | Christie et al. |
| 6,031,840 A | 2/2000 | Christie et al. |
| 6,047,006 A | 4/2000 | Brakefield et al. |
| 6,067,350 A | 5/2000 | Gordon |
| 6,081,525 A | 6/2000 | Christie et al. |
| 6,104,711 A | 8/2000 | Voit |
| 6,108,704 A | 8/2000 | Hutton et al. |
| 6,115,380 A | 9/2000 | Christie et al. |
| 6,128,304 A | 10/2000 | Gardell et al. |
| 6,137,869 A | 10/2000 | Voit et al. |
| 6,137,870 A | 10/2000 | Scherer |
| 6,157,636 A | 12/2000 | Voit et al. |
| 6,215,866 B1 | 4/2001 | Salisbury |
| 6,243,373 B1 | 6/2001 | Turock |
| 6,282,574 B1 | 8/2001 | Voit |
| 6,298,062 B1 | 10/2001 | Gardell et al. |
| 6,298,064 B1 | 10/2001 | Christie |
| 6,304,572 B1 | 10/2001 | Christie |
| 6,330,224 B1 | 12/2001 | Christie et al. |
| 6,339,594 B1 | 1/2002 | Civanlar et al. |
| 6,347,085 B2 | 2/2002 | Kelly |
| 6,359,880 B1 | 3/2002 | Curry et al. |
| 6,430,275 B1 | 8/2002 | Voit et al. |
| 6,430,282 B1 | 8/2002 | Bannister et al. |
| 6,442,169 B1 | 8/2002 | Lewis |
| 6,452,932 B1 | 9/2002 | Christie |
| 6,456,594 B1 | 9/2002 | Kaplan et al. |
| 6,473,429 B1 | 10/2002 | Christie |
| 6,600,733 B2 | 7/2003 | Deng |
| 6,614,781 B1 | 9/2003 | Elliott et al. |
| 6,633,561 B2 | 10/2003 | Christie |
| 6,661,882 B1 | 12/2003 | Muir et al. |
| 6,665,294 B2 | 12/2003 | Christie |
| 6,804,224 B1 | 10/2004 | Schuster et al. |
| 6,856,617 B2 | 2/2005 | Lee et al. |
| 7,020,087 B2 | 3/2006 | Steinberg et al. |
| 7,046,786 B2 | 5/2006 | Liesenberg |
| 7,239,644 B2 | 7/2007 | Christie et al. |
| 7,269,247 B2 | 9/2007 | Mashinsky |
| 7,286,561 B2 | 10/2007 | Christie |
| 7,324,534 B2 | 1/2008 | Christie et al. |
| 7,412,051 B1 | 8/2008 | Beathard et al. |
| 7,454,000 B1 | 11/2008 | Henderson |
| 7,466,690 B2 | 12/2008 | Schrodi |
| 7,561,519 B1 | 7/2009 | Ash et al. |
| 7,609,637 B2 | 10/2009 | Doshi et al. |
| 7,761,579 B2 | 7/2010 | Khasnabish |
| 2003/0108176 A1 | 6/2003 | Kung et al. |
| 2006/0039397 A1 | 2/2006 | Hari et al. |
| 2006/0190412 A1 | 8/2006 | Ostroff |
| 2007/0195755 A1 | 8/2007 | Li et al. |
| 2008/0152091 A1 | 6/2008 | Kivimaki |
| 2009/0191873 A1 | 7/2009 | Siegel et al. |

(56) References Cited

U.S. PATENT DOCUMENTS

| | | | |
|---|---|---|---|
| 2009/0252149 A1 | 10/2009 | Zhu et al. | |
| 2010/0075673 A1 | 3/2010 | Colbert et al. | |
| 2010/0118714 A1 | 5/2010 | Labovitz | |

FOREIGN PATENT DOCUMENTS

| | | |
|---|---|---|
| GB | 2 198 011 | 6/1988 |
| GB | 2 316 266 | 2/1998 |
| JP | 07 131486 | 5/1995 |
| WO | WO 92-01350 | 1/1992 |
| WO | WO 93-16543 | 8/1993 |
| WO | WO 93-16544 | 8/1993 |
| WO | WO 93-16546 | 8/1993 |
| WO | 94/11813 A1 | 5/1994 |
| WO | WO 94-28683 | 12/1994 |
| WO | WO 97/16916 | 5/1997 |

OTHER PUBLICATIONS

C. Yang, RFC 1789—INETPhone: Telephone Services and Servers on Internet, University of North Texas, Apr. 1995, pp. 1-6.

"Survey: Telecoms", in The Economist, vol. 344, No. 8034, (Sep. 13, 1997), pp. 56/1-56/34.

"Auctioning Telephone Calls", in The Economist, vol. 344, No. 8032 (Aug. 30, 1997), pp. 47-48.

"Book Review, Impact of Liberization on Resale and Callback Telecommunications Policy", vol. 21, No. 3, pp. 275-276 (1997).

Brennan, "Industry Parallel Interconnection Agreements", Information Economics and Policy, vol. 9, No. 2, pp. 133-149.

J. Tao & R. Martinez, "Internet Access Via Baseband and Broadband ISDN Gateways", Dec. 4, 1994 (IEEE).

R. Frieden, "The International Telecommunications Toll Revenue Division Process", International Telecommunications Handbook (1996), pp. 133-149.

Y. Levy, S. Durinovic-Johri, and R.A. Milito, "Dynamic Network Call Distribution with Periodic Updates", in Teletraffic Science and Engineering, vol. 1a (J. Labetoulle, and J.W. Roberts, ed.) (1994). Elsevier.

Raif O. Onvural, Asynchronous Transfer Mode Networks: Performance Issues (1994), Section 6.3-6.4 Artech House.

B. Yuhas & N. Ansari ed., Neural Networks in Telecommunications (1994), Chapter 1, Kluwer.

S. Globerman, T.H. Oum, and W. T. Stanbury, "Competition in Public Long-distance Telephone Markets in Canada", Telecommunications Policy, vol. 17, No. 4, pp. 297-312 (1993).

R. Frieden, "International Toll Revenue Division: Tackling the Inequities and Inefficiencies", in Telecommunications Policy, vol. 17, No. 3 (Apr. 1993) pp. 221-133.

R. J. Horrick & R. Scarr, "Chapter 24: Tariff Principles" , is Future Trends in Telecommunications (1993), pp. 387-392, J. Whitaker & Sons.

K. Cheong & M. Mullins, "International Telephone Service Imbalances: Accounting Rates and Regulatory Policy", Telecommunications Policy, vol. 15, No. 2 (Apr. 1991), pp. 107-118.

R. M. Frieden, "Accounting Rates: The Business of International Telecommunications and the Incentive to Cheat", 43 Federal Communications L.J. 111 (1991).

K.B. Stanley, "Balance of Payments, Deficits, and Subsidies in International Communications Services: A New Challenge to Regulation", in 43 Administrative Law Review 411 (Summer 1991).

N.F. Maxemchuk & M. El Zarki, "Routing and Flow Control in High-Speed Wide-Area Networks", in Proceedings of the IEEE, vol. 78, No. 1 (Jan. 1990), pp. 204-221, IEEE.

A. Girard, Routing and Dimensioning in Circuit-Switched Networks (1990), Addison-Wesley, (Table of Contents Only).

Warfield & P. Sember, "Prospects for the Use of Artificial Intelligence in Real-Time Network Traffic Management", in Computer Networks and ISDN Systems, vol. 20 (1990), pp. 163-169, Elsevier Science.

J. Potvin, & S.F. Smith, "Flexible Systems for the Design of Heuristic Algorithms in Complex or Domains", in Impact of Recent Computer Advances on Operations Research (1989), pp. 332-344, Elsevier Science.

G. L. Shultz & R.R. Meyer, "Flexible Parallel Algorithm for Block-Constrained Optimization Problems", in Impact of Recent Computer Advances on Operations Research (1989), pp. 82-91.

M. Schwartz, Telecommunications Networks (1987), Sec. 6-2, Addison-Wesley.

Sam Halabi and Danny McPherson "Evolution of the Internet" in Internet Routing Architectures, Second Edition pp. 1-35, Cisco Press, 2000 Indianapolis, IN.

"NSFNET Acceptable Use Policy" in Coalition for Networked Information-Information Policies: A Compilation of Position Statements, Principles, Statutes, and Other Pertinent Statements, pp. 1-2, National Science Foundation Annual Report 1988, Washington D.C.

"Wideband Communication" in Annual Technical Report, pp. 77-89, University of Southern California, Jul. 1, 1981.

Daniel Minoli and Emma Minoli "Voice over IP" in Delivering Voice over IP Networks, pp. 213 & 215, John Wiley & Sons, Inc , 1998 New York, NY.

Christian Huitema, Jane Cameron, Petros Mouchtaris, and Darek Smyk, An Architecture for Residential Internet Telephony Service, pp. 50-56, IEEE Network May/Jun. 1999.

Bo Li, Mounir, Dongyi Jiang, Xi-Ren Cao and Y. Thomas Hou, QoS-Enabled Voice Support in the Next-Generation Internet: Issues, Existing Approaches and Challenges, pp. 54-61, IEEE Communications Magazine, Apr. 2000.

Cole, R. et al., "Network Secure Communication," in 1979 Annual Technical Report: Research Program in Computer Technology, Marina del Rey, Calif.: University of Southern California Information Sciences Institute, pp. 53-70, (Sep. 1979).

M.I.T. Lincoln Laboratory Network Speech Systems Technology Program, Annual Report to the Defense Communications Agency, Feb. 1982.

M.I.T. Lincoln Laboratory Network Speech Systems Technology Program, Annual Report to the Defense Communications Agency, Feb. 1984.

Casner, S. et al., "Wideband Communication," in 1984 Annual Technical Report: Research Program in Computer Technology, Marina del Rey, Calif.: University of Southern California Information Sciences Institute, pp. 74-85, (Jun. 1984).

Forgie, J., "ST—A Proposed Internet Stream Protocol," IEN 119, MIT Lincoln Laboratory, (Sep. 7, 1979).

NVP, NVP-II, ST, and ST-II protocols.

Jubin, J. and Tornow, J., "The DARPA Packet Radio Network Protocols," Proceedings of the IEEE, vol. 75, No. 1, (Jan. 1987).

Lowery, C. "Protocols for Providing Performance Guarantees in a Packet Switching Internet," U.C. Berkeley, (Jan. 1991).

Lars A. Børve, et al., "Standards for wide-area paging—the situation in Norway and Europe," Telektronikk Technical Journal, Apr. 1995, pp. 48-62.

International Telecommunication Union ("ITU") Standard, ITU-RM 539-3, "Technical and operational characteristics of international radio-paging systems," 1994.

Witold Hdubowicz, "1990's—the decade of pan-European digital standards in wireless communications," IEEE International Conference on Personal Wireless Communications, pp. 91-95, Feb. 1996.

Goran Edbom, "The Concept for World Wide Radio Paging," 41st IEEE Vehicular Technology Conference, pp. 840-847, May 1991.

Thomas Beijer, "A Pan European Paging System," IEEE Conference Proceedings on Area Communication, pp. 482-485, Jun. 1988.

Goran Edbom, "A Scheme for High Speed Paging Systems," IEEE Conference Proceedings on Area Communication, pp. 412-415, Jun. 1988.

C. Rindorf, "Data Networking Using Public Paging Systems," 5th IEEE International Symposium on Personal, Indoor and Mobile Radio Communications, vol. 4, pp. 1417-1418, Sep. 1994.

European Telecommunications Standards Institute ("ETSI") ERMES Standards (e.g., ETR 050 (1993).

Lars Gandils, "Trends in Wide Area Paging," Ericsson Review, vol. 71, No. 4—pp. 167-171, 1994.

John Walker, "Mobile Information Systems," Artech House 1990.

(56) References Cited

OTHER PUBLICATIONS

"Swiss Telecom PTT and TDR sign world's first ERMES roaming agreement," European Public Paging Association ("EPPA"), In Touch Magazine, published by Dec. 1995, p. 2.
European Radiocommunications Committee ("ERC") Recommendation, T/R 25-07, "Frequency Coordination for the European Radio Message System (ERMES)," Mar. 1993.
ITU Report M.499-5, "Radio-paging systems," 1990, pp. 57-71.
Michael Paetsch, "Mobile Communications in the US and Europe," Artech House 1993.
"Mobile Opportunities Abound," Communications Week International, Mar. 1990.
World Paging Subscriber Base Expected to Break 100 Million by Mid 1996; By Year.
2000, Demand Projected to Reach 200 Million, PR Newswire, Jun. 27, 1996; and.
European Radio Message System ("ERMES") as publicly known in the United States by Nov. 19, 1996.
Roberts, L. The evolution of packet switching. Proceedings of the IEEE, vol. 66, No. 11, (Nov. 1978).
Shoch, John F. Carrying voice traffic through an Ethernet local network—a general overview. Xerox Corporation (Aug. 1980).
Rettberg, R. et al., "Development of a Voice Funnel System: Design Report," Report No. 4098, Bolt Beranek and Newman, Inc. (Aug. 1979).
Schulzrinne, Henning, "Voice Communication Across the Internet: A Network Voice Terminal," University of Massachusetts Amherst (Jul. 1992).
Shacham, N., Craighill, E., and Poggio, A., "Speech Transport in Packet-Radio Networks with Mobile Nodes," IEEE Journal on Selected Areas in Communications, vol. SAC-1, No. 6, (Dec. 1983).
Schooler, E. & Casner, S., "A Packet-switched Multimedia Conferencing System," SIG OIS Bulletin, vol. 10(1), (Jan. 1989).
Andrews et al., "Faster Packets for Tomorrow's Telecommunications," AT&T Technology, ABI/INFORM Global, (1988).
Cohen, D., "A Protocol for Packet-Switching Voice Communication," North-Holland Publishing Co., Computer Networks 2 (1978).
Gruber, J. and Nguyen, H., Performance Requirements for Integrated Voice/Data Networks, IEEE Journal on Selected Areas in Communications, vol. SAC-1, No. 6, (Dec. 1983); and.
Mahmoud, S. et al., "An Integrated Voice/Data System for VHF/UHF Mobile Radio," IEEE Journal on Selected Areas in Communications, vol. SAC-1, No. 6, (Dec. 1983).
Patent Owner AIP Acquisition, LLC's Preliminary Response, Patent Trial and Appeal Board Proceeding No. IPR2013-00296, Doc. No. 13 (Aug. 26, 2013).
Request for Comments 1190 "Experimental Internet Stream Protocol, Version 2 (ST-II),"C. Topolcic ed. (Oct. 1990).
University of Southern California Information Sciences Institute, "1982 Annual Technical Report: A Research Program in Computer Technology," Report No. ISI/SR-83-23, Chapter 7 (Mar. 1983).
Request for Comments 791 "Internet Protocol" (Sep. 1981).
Cerf, et al. Request for Comments 675 "Specification of Internet Transmission Control Program" (Dec. 1974).
Robert M. Gray, "The 1974 Origins of VoIP," IEEE Signal Processing Magazine (Jul. 2005).
Dennis G. Perry, et al.,"The ARPANET and the DARPA Internet," Library Hi Tech, vol. 6, No. 2 (1988).
Travis Russell, "Signaling System #7" (McGraw-Hill 1995) (selected pages).
John G. van Bosse, "Signaling in Telecommunication Networks" (John Wiley & Sons 1998) (selected pages).
Decision Instituting Inter Partes Review, Patent Trial and Appeal Board Proceeding No. IPR2013-00296, Doc. No. 14 (Oct. 31, 2013).
DJ. Crowcroft, et al., "Multimedia TeleConferencing over International Packet Switched Networks," Proceedings of TRICOMM'91, IEEE Conference on Communication Software (1991).
James W. Forgie, "ST—A Proposed Internet Stream Protocol," IEN 119 (Sep. 7, 1979).

International Telecommunication Union Recommendation Q.23, "Technical Features of Push-Button Telephone Sets" (Approved Nov. 1988).
International Telecommunication Union Recommendation Q.24, "Multifrequency Push-Button Signal Reception" (Approved Nov. 1988).
Vision O.N.E. Concept Paper ST-6 Call Processing, Jul. 25, 1991.
"RFC 793—Transmission Control Protocol, DARPA Internet Program Protocol Specification" prepared for Defense Advanced Research Projects Agency by Information Sciences Institute, University of Southern California, Sep. 1981 (published).
"Packet Speech Program Review Meeting" Sponsored by Department of Defense Defense Advanced Research Projects Agency Jun. 3, 1982 (published).
Vinton G. Cerf, et al., "The DoD Internet Architecture Model" Computer Networks 7 (1983), North Holland (published).
"CSNET Protocol Software: The IP-To-X.25 Interface" Douglas Corner and John T. Korb Computer Science Department, Purdue University, 1983 (published).
Timothy Ramteke, Networks, Prentice-Hall, Inc. 1994 (published).
Danny Cohen, RFC 741—Specifications for the Network Voice Protocol (NVP), Information Sciences Institute, University of Southern California, Nov. 22, 1977 (published).
Newton's Telecom Dictionary, Flatiron Publishing Inc., 8th ed., 1994 (published).
R.F.Rey, Engineering and Operations in the Bell System, AT&T Bell Laboratories, Inc., 2nd ed., 1983 (published).
John DeTreville and W. David Sincoskie, "A Distributed Experimental Communications System" IEEE Journal on Selected Areas in Communications, vol. SAC-1, No. 6.
Philip Marsden, "Interworking IEEE 802/FDDI LAN's Via the ISDN Frame Relay Bearer Service" in Proceedings of the IEEE vol. 79 No. 2, pp. 223-229 Feb. 1991.
Andrew S. Tanenbaum, Computer Networks, Third Edition, pp. 60, 121-123, 412-413, 450, 452-455, 473, Prentice Hall 1996.
A. Marine, J. Reynolds, G. Malkin, "FYI on Questions and Answers: Answers to Commonly asked 'New Internet User' Questions", pp. 1-44 Mar. 1994.
Rao J. Cherukuri and Jefferey H. Derby, "Frame Relay: Protocols and Private Network Applications", IEEE, pp. 676-685, 1989.
Michael J. Gurrie and Patrick J. O'Connor, "Voice/Data Telecommunications Systems: An Introduction to Technology", pp. 222-224, Prentice Hall 1986.
Bijan Jabbari, "Common Channel Signalling Systen No. 7 for ISDN and Intelligent Networks" in Proceedings of the IEEE vol. 79, No. 2, pp. 155-169, Feb. 1991.
1996 Telecom Public Switched Telephone Network (PSTN) Analogue Line Interface (TNA 102: Jun. 1996).
Joseph A. Pecar, Roger J. O'Connor, David A. Garbin, Telecommunications Factbook: A readable guide to planning and acquiring products and services, pp. 98-100 McGraw-Hill 1993.
E. Bryan Carne, Telecommunications Primer: Signals, Building Blocks and Networks, pp. 293-297, Prentice Hall 1995.
James Martin, Telecommunications and the Computer, Third Edition, pp. 618-620, Prentice Hall 1990.
Harry Newton, Newton's Telecom Dictionary: The Official Dictionary of Telecommunications, 13th Edition, pp. 622-623, Telecom Books and Flatiron Publishing 1998.
RFC: 793, Transmission Control Protocol, DARPA Internet Program, Sep. 1981.
Merritt, Ian "Providing Telephone Line Access to a Packet Voice Network," Marina del Rey, Calif.: Information Sciences Institute, University of Southern California, pp. 1-15, Feb. 1983.
Casner, S, et al. "Wideband Communication" in 1982 Annual Technical Report: Research Program in Computer Technology, Marina del Rey, Calif.: University of Southern California Information Sciences Institute, pp. 1-11, 85-97; Mar. 1983.
O'Leary, G.C., et al. "A modular approach to packet voice terminal hardware design," in AFIPS Conference Proceedings, vol. 50: National Computer Conference, pp. 183-188, AFIPS Press, May 1981.

(56) References Cited

OTHER PUBLICATIONS

Weinstein, C. and Forgie, J. "Experience with speech communication in packet networks," IEEE Journal on Selected Areas in Communication, Special Issue on Packet Switched Voice and Data Communications, vol. 1, No. 6, Dec. 1983, pp. 963-980.

Peterson, Larry L. and Davie, Bruce S., Computer Networks A Systems Approach, 1996, pp. 177-180, Morgan Kaufman Publishers, Inc., San Francisco, California, USA.

Perlman, Radia, Interconnections: Bridges and Routers, 1992, pp. 127-147, Addison-Wesley Publishing Company, USA.

* cited by examiner

Subscriber Registry

| User Name | Device Type | Network | Device Identifier | Subscription | MAC |
|---|---|---|---|---|---|
| John.Doe@abc.com | iPhone | ATT Wireless | Tel: 89123920439 | Active, Monthly | cywe.r123.3413 |
| | Laptop | IP | Sip: user1@where.com | Active, Monthly | 01-23-45-67-89-ab |
| | Fixed line phone | Verizon | Tel: 2126452030 | Active, Monthly | ax09.0323.12lk |
| Sheldon@imail.com | Android | Deutsche Telecom | Tel: +49(0) 89-99 99 99-21 | Active, Per Use | plkw.e0321.ep9f |
| | Desktop PC | IP | Sip: user2@here.com | Active, Per Use | v3ac.a313.rt24 |
| | Laptop | Skype | Username: John.Doe | Active, 3 months | N/A |
| | | | | | |
| | | | | | |

*Fig. 12*

```
MemberID,prefix,packetloss,latency,jitter,availability,bgpstability,date
1.1.1.1,198.37.37.0/24,0,40,10,1,0,20040120I2I2
1.1.1.1,198.182.38.0/24,0,80,15,1,13,20040120I2I2
1.1.1.1,204.188.0.0/15,10,35,5,1,2,20040120I2I2
1.1.1.2,204.188.0.0/15,30,55,25,1,0,20040120I2I2
1.1.1.2,205.216.0.0/14,0,102,10,1,1,20040120I2I2
1.1.1.2,205.136.0.0/16,0,12,1,1,0,20040120I2I2
```

*Fig.* 22

SYSTEM AND METHOD FOR MANAGING MULTIMEDIA COMMUNICATIONS ACROSS CONVERGENT NETWORKS

CROSS-REFERENCE TO RELATED APPLICATIONS

The present application is a continuation of U.S. patent application Ser. No. 12/766,691 filed on Apr. 23, 2010.

U.S. patent application Ser. No. 12/766,691 is a continuation-in-part of 11/042,597, filed on Jan. 24, 2005, which is now issued as patented which claims benefit of 60/538,320 filed on Jan. 22, 2004, all of which are incorporated herein by reference in their entirety.

BACKGROUND OF THE INVENTION

1. Field of the Invention

The present invention relates to a system for providing transparent access to different types of communication networks that may be incompatible with each other and some of which may be incompatible; with the equipment used by the calling party or the called party, least cost routing in such a system, maintaining quality of communication in such a system, prioritizing the routing of such communications, evaluating different communication access locations to determine where to send a communication, synchronizing communications, blocking incoming communications while waiting for the synchronizing to be completed, and minimizing the cost of communications using such a system. This system also monitors and records the services used on each of the unrelated service providers. This information is then utilized for billing purposes and for paying the service providers.

The present invention also relates to the managing of communications through the IP network. In particular, the present invention relates to the optimization of the routing of multimedia communications among user devices across convergent networks.

2. Description of the Related Art

Presently when communication services are offered on a global basis, communications are established through the equipment of a plurality of service providers located in various countries. This communication is dominated by large carriers which have formed the global network through reciprocal agreements. Smaller competing carriers, who may offer the same service at lower prices, currently do not have reciprocal agreements between them.

The invention provides these smaller competing carriers with access to each other without the use of the large carriers. Such access provides the calling party (e.g., a subscriber of the smaller competing carrier) with the option of obtaining optimum service at lower prices while ensuring that the appropriate service providers get paid. The calling party can now have cheaper access to different types of telecommunication networks that the party may not have access to under the current large carrier system. It may be cheaper or preferred for the calling party to use smaller carriers to communicate with another location by routing the communication over a digital data network rather than an analog voice network, or by routing the communication over a paging network rather than a cellular network or a combination of networks.

With computing devices rapidly evolving to include sophisticated communicating functions, consumers or end users are becoming more and more exposed to the possibilities of communicating with each other via audio and visual media. Voice calls no longer suffice as a means of communication. This phenomenon is what some may call telecommunications media convergence which transcends traditional telecom industries such as fixed, mobile, and IP service providers. Convergence is the combination of different media into one operating platform. Thus, a convergent network (as used herein) is a network comprising various protocol-specific networks such as circuit-switched, mobile, and IP networks which are interconnected with each other. It is the merger of telecom, data processing and imaging technologies. This convergence is shepherding in a new era of multimedia communication, wherein voice, data, images and video are merged and become part and parcel of any telecommunications services demanded by the end users.

In this convergent world, the network operators must be capable of routing high quality multimedia contents between fixed or mobile devices such as, for example, smart phones, laptops, iPads, desktops, and audio-video equipment. To provide a quality user experience, network operators need to ensure their networks have the requisite or appropriate transmission characteristics such as bandwidth, latency, and jitter in the case of an IP network for the transmission of multimedia content. However, traditional network operators' ability to choose routes are confined to their own networks and typically do not have control over communications that transcend across multiple networks. Moreover, the transmission of multimedia content, especially broadcast quality high definition video, requires the networks to transport the content with high fidelity, i.e. with little or no loss of data. This is a difficult task in a world where the IP networks dominate and offer the least cost alternative for content transmission, but which are notorious for latency and packet loss. When the multimedia communications occur over the disparate networks of different technologies and protocols, the management of high quality multimedia communications can become insurmountable or very expensive.

Accordingly, there is a need for a cost-effective system that can manage and selectively route multimedia communications among multiple parties, transparent and seamless to the users, through one or more service providers or network operators based on user requirements. Such requirements may be based on, for example, whether the content comprises high definition video or merely voice data coupled with low fidelity video or based on the hardware and/or client software characteristics of the access devices. In the case of internet service providers, and as explained below, the system can perform practical quality test measurements of each route available or offered by the internet service providers for routing subscriber communications traffic.

Some insight into the workings of the Internet is in order. It is widely known that the Internet is a worldwide network of interconnected networks. Each individual host connected to the internet has an IP address. To send a data packet from one host to another, the data packet must be routed through the Internet. To accomplish this, each host includes a routing table the host uses to determine which physical interface address to use for sending the data. When a host receives a data packet, the data packet is either intended for that host or intended for another host. When the latter occurs, the host retransmits the packet using its own route table. Route tables are based on static rules or dynamic rules via routing protocols. Accordingly, the quality of the route depends on the quality of each host that the packet passes through and the network elements that connect the hosts. It would be useful to know the quality level of each particular host along a route so that packets requiring a higher quality could be routed using hosts having a high quality measurement score.

Some individual quality indicators such as, for example, latency, availability, packet loss may be determined for certain routes on the Internet. However, depending on the type of multimedia content to be delivered, the best route for one application (e.g. near real-time broadcast) may be the route with the lowest latency characteristics, while the best route for another application (e.g. high definition video) may require the least packet loss characteristic.

SUMMARY OF THE INVENTION

One objective of the invention is to provide communication between otherwise incompatible communication networks in a manner that is transparent to the calling party (that is, the subscriber of the service initiating the communication), while assuring that each service provider that renders service in routing that communication gets paid. Preferably, the communication is routed based on the results from an evaluation of all available communication networks even though the calling party may have direct access to only one type of communication network.

In accordance with the invention, control information in the form of an inquiry of the availability status of the party to be called may be sent through different networks by routing it through a control location of the inventive system that converts it into a compatible form. For instance, the called party may be using one type of network, such as a data network having E-mail, while the calling party is using another, such as a cellular network.

With a conventional data network, sending an E-mail message to an address on the data network does not indicate the availability of a party on a cellular network to communicate. In accordance with one embodiment of the invention, however, the control location of the inventive system is connected with both the data network and the cellular network to convert the control information associated with E-mail into a form compatible on the cellular network for making an inquiry and then transmits the inquiry over the cellular network.

The inventive system may have external or internal software and hardware that intercepts the normal transmission to route it appropriately. The system effects further routing, which may include converting between different forms of communication networks, compressing voice into data packets or decompressing data packets into voice, coding and decoding transmissions for security reasons, and multiplexing communications over the same lines. The system records the various routing transactions involved in the communication and calculates the billing of the transactions in a manner that is transparent to the calling party.

Another objective of the invention is to interrogate the called party number's communication availability prior to conferencing the calling party and called party. The inventive system may have a control location that receives both a calling party and a called party access number or identification. After receiving these access numbers, the system initiates an inquiry to the called party from the control location and waits for a status signal as to the called party location's availability to take incoming calls. If the status signal indicates an available status, a first communication is initiated to the called party access number from the control location and a second communication is initiated to the calling party access number from the control location. Thereafter, the first and second communications are bridged using the same or different networks.

In addition to interrogating the called party's availability status, the control location determines where to route the call by examining factors such as transmission cost, the appropriate network for the desired transmission, the service provider that provides this kind of network and the plurality of available called party locations that service the called party access number. The control location also considers communication networks that are available to the called party locations and the identity of service providers who provide those communication networks across the various called party locations. After receiving the calling party and called party access numbers, the control location performs an inquiry as to which service provider and which network can route the transmission.

In addition to technological considerations, the control location also studies the various cost to perform the desired transmission and records such information for both monitoring and billing purposes. An authorizer uses such information to monitor all incoming and outgoing transactions between the network service providers and provide clearance insuring payment and settlement of all transaction for each of these operators.

In routing communications, the control location takes into consideration customer defined preference criteria relating to preferences for particular types of communication network, transmission quality, cost, security, and priority of transmission. For example, if the quality of a transmission is not acceptable, the transmissions may be rerouted to any other available network that can transmit with better quality, thereby ensuring that the quality of the transmission satisfies the customer's preference criteria for transmission quality. The calling party access number itself may include a message or protocol containing preference criteria selections.

Another objective of the invention involves synchronizing the completion of callback from the control location to the calling party and called party legs of communication. The synchronization involves the calculation of the waiting time that is necessary before the control location commences each callback. The waiting time may be fixed or read from memory off a data base located at the control location. This synchronization may result in completion of both communications simultaneously or with minimal delay, i.e., a significantly shorter delay than without the synchronization. Such synchronization results in more efficient use of the network at a lower cost.

While the control location is waiting to initiate completion of one of the callback legs of communication, an incoming communication may block the completion of that one leg and thereby interrupt the synchronization from taking place. The blocking period may be for a fixed time period or may be based on information in a data base that includes information relating to the expected waiting time for completing communications.

In accordance with all embodiments of the invention, the communication being established may be two-way.

Another object of the present invention is to provide a method and system for optimized routing of bidirectional or duplex multimedia communications among multiple parties in a convergent network.

Another object of the invention is to facilitate communication between otherwise incompatible communication networks in a manner that is transparent to the calling and called parties. Preferably, the communication is routed based on the results from an evaluation of all available communication networks even though the calling party may have direct access to only one type of communication network. Control information in the form of an inquiry of the availability status of the party to be called may be sent through different networks by routing it through a control location or gateway of the inventive system that converts it into a compatible form. For instance, the called party may be using one type of network, such as a data network (e.g. IP network, GPRS or 3G), while the calling party is using another, such as a GSM cellular network (or circuit switched network). A system that delivers and converts telecommunications traffic across multiple networks including IP network(s) such as the Internet is disclosed in a parent application, U.S. patent application Ser. No. 11/895,460 (the '460 patent application), which is incorporated herein by reference in its entirety.

Still another object of the invention is to enable a user device to communicate audio and/or video content on a one-to-one (i.e. unicast) or one-to-many (multicast) basis using optimized routes through the IP network.

In one aspect of the invention, a convergent communications platform interconnects Internet Backbone Providers (IBPs), as sellers, and Internet Service Providers (ISPs) as buyers of IP capacity in the form of routes within networks owned by the sellers (on-net routes), routes in networks that are not owned by the seller (off-net routes), or routes which include both on-net and off-net portions. The platform routes traffic to the sellers based on the type of service required for transmitting the communications traffic between the calling (i.e. transmitting) and called (i.e. receiving) parties.

In another aspect of the invention, the convergent communications platform includes (1) a control node for call signaling or session control of communications between user devices and the delivery of the multimedia content, and (2) a database for storing profiles and data related to the user devices. The control node is configured to include SIP servers for call session controls, media servers for the manipulation and delivery of content, and switches for switching communications traffic to selected seller networks. Gateways in operable communication with the control node convert signals and multimedia content between otherwise incompatible telecommunications networks. The user devices may be identified by MAC address, IMSI, TMSI, URI, IMEI, MSISDN, or a universal identifier selected by or assigned to the user and registered with the convergent communications platform for identifying all of his devices capable of accessing the various networks through the platform.

In one embodiment, the platform facilitates bidirectional communications (e.g., video conferencing), or unicast and/or multicast by distributing the multimedia streams from a transmitting user device to one or more receiving user devices as designated by the users, and vice versa. Such functions would be desirable in a broadcast mode (i.e. one way transmission) or a video conferencing mode (i.e. bidirectional transmission). The user or transmitting device specifies the one or more receivers for receiving the communication and the control node contacts the receivers using signaling control systems such as SIP servers, SS7 networks, or their equivalents.

In another embodiment, the platform, in a multicast mode, directs one or more receiving device to report the available bandwidth in its local network so as to enable the platform to select a receiving device (or node) to retransmit or uplink the multimedia content to another receiving device (in a manner that may be referred to as P2P or P4P). In this manner, the platform need not establish a one-to-one client-server relationship with each receiving device, thereby reducing the bandwidth requirement on the platform and shifting the bandwidth usage onto the local network of the user devices. An advantage of this streaming technique is to allow for real time scaling of a multicast audience without overwhelming the allocated channel capacities of the platform. Another advantage of such technique is to enable a service provider to optimize the local bandwidth usage of local networks.

Secure bidirectional multimedia communication may be provided by creating a secure channel between the platform and the user devices through the use of secure web protocols similar to the HTTPS protocol. In this case, the platform serves as the hub for encrypting and decrypting the multimedia communications between the sending and receiving devices.

The routing of communications traffic may be driven by an optimized routing application, which determines traffic distribution to participating sellers (i.e. IBPs selling IP routes) with the desired quality within certain pricing and quality parameters based on user defined preferences or otherwise required by user devices. The platform may generate an optimized routing table customized for each buyer to suit their unique combination of price and quality parameters.

According to another aspect of the invention, the platform measures the quality of the IP routes of the sellers by testing the penultimate hop router or the last network device in accordance with the quality measuring system more described herein and in the parent application U.S. patent application Ser. No. 11/042,597 (the '597 patent application), which is incorporated herein by reference in its entirety.

According to yet another aspect, there is provided a multimodal access device capable of establishing a call session through a cellular, a circuit switched or an IP network. It is configured to include contact information of a called party that comprises a telephone number and a user identification for an IP based communication service provider (e.g. Google Voice™ or Skype™), the access device being responsive to a user selection of the called party for communication. The access device establishes a call session with the called party via the IP based communication service provider when the IP based communication service provider indicates the called party is available or via the cellular or circuit switched network when the IP based communication service provider indicates the called party is not available. The access device may have direct access to presence information database to determine availability of a called party. The presence information includes status information such as "on-line", "away", "mobile", etc. of a user of services (e.g. instant messaging or chat) of an IP based communications service provider.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 12 is an embodiment of a registry of subscribers registered with the central node or convergent communications platform;

FIG. 22 is a diagram showing the format of file for a member quality matrix;

DETAILED DESCRIPTION OF THE PREFERRED EMBODIMENTS

Figure 1:
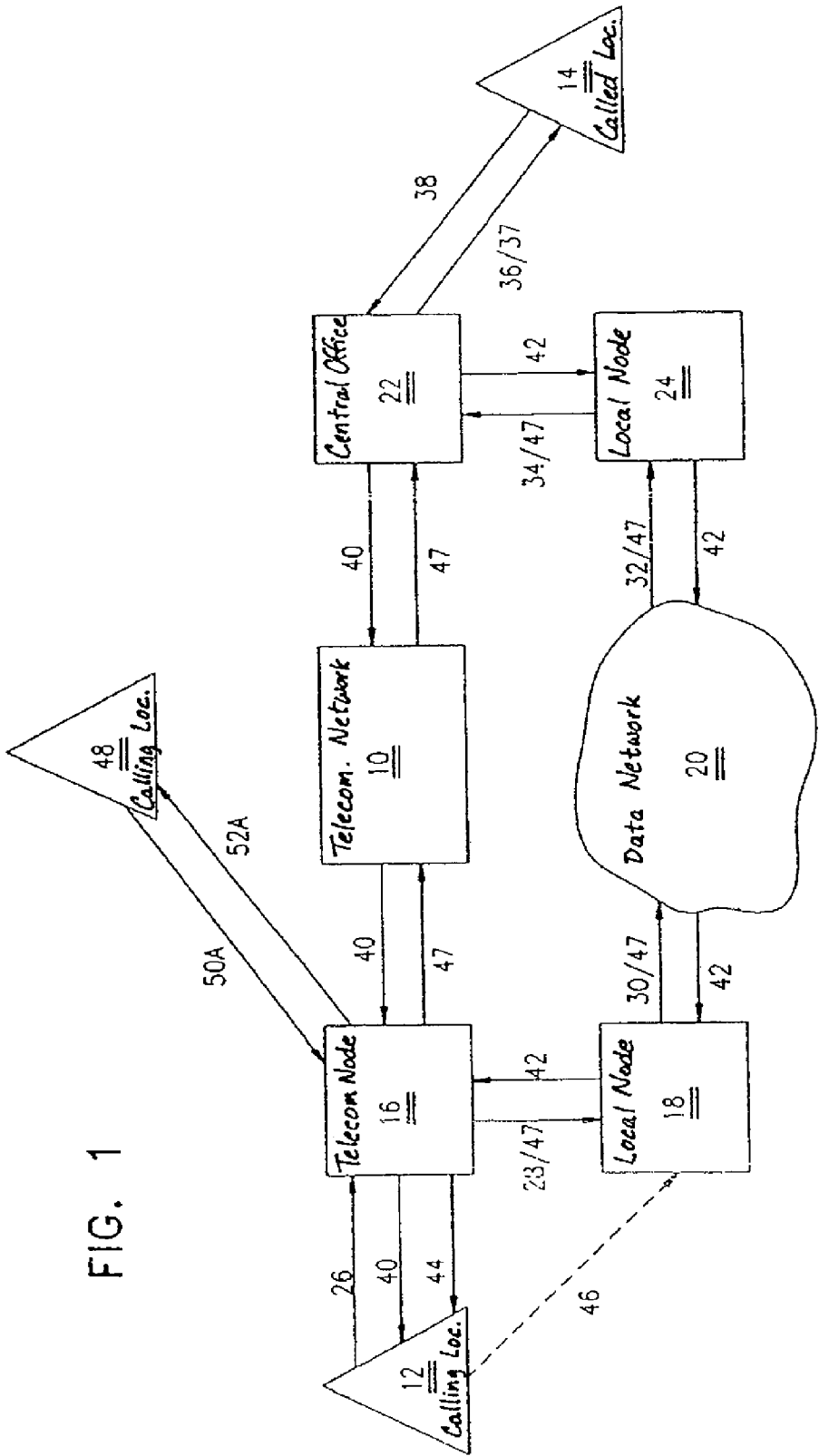
FIG. 1 is a conceptual block diagram indicating the principles of operation of the inventive method to interrogate over a data network and transmit voice over the data network.

Turning to FIG. 1, a schematic drawing depicting a method of sending a voice or digital transmission to a local node is shown. For ease in understanding, this drawing is the same as FIG. 1 of the copending U.S. patent application Ser. No. 08/320,269 (the '269 application), filed Oct. 11, 1994 by the present inventor and entitled METHOD OF AND SYSTEM FOR EFFICIENT USE OF TELECOMMUNICATION NETWORKS (as amended), whose contents are incorporated herein by reference.

The '269 application describes a technique by which hotels, and other similarly situated establishments, can make use of international callback technology. The reference numbers in FIG. 1 of the '269 application are the same as those in FIG. 1 of the present application, i.e., a telecommunications network 10, calling location 12, called location 14, transparent telecommunications node or intercept 16, first central local node 18, data network 20, central office 22, second central local node 24, phonecall 26, link 28 to central local node 18, link 30 to the external channel 20, link 32 to the second central local node 24, line 36 over which a first phonecall 27 is made to interrogate the called location 14 and over which is sent back a call supervision status signal 38, a callback 40, an uncompleted call signal 42, a message 44, a reverse answer supervision signal 47 and a calling location 48 that places a call 50A or receives a callback 52A.

The calling location 12 may be where a data transmission originates or where a voice communication originates for eventual receipt by the calling location 14. While phonecalls are certainly one form of communication envisioned, the invention covers any type of communication, whether it involves public service telephone networks, cellular networks, paging networks, data networks, analog networks, etc. A call is to be interpreted as any form of communication over a network and not limited just to voice phonecalls.

While such a technique is particularly suited to callback situations that employ a voice network, it is also applicable to employing digital data based networks such as the internet computer network. For instance, instead of routing a call direct between locations A and B using technology X, it may be cheaper to use callbacks from location C to location A and from location C to location B using technology Y.

As used in this application, the term "calling party" designates the initiator of the transmission or communication, which may include callers over phone networks, subscribers that use data, cellular or paging networks, etc. The term "called party" designates the ultimate receiver of the transmission or communication from the calling party and with whom communication is being effected. The called party may include users of phone networks, cellular networks, paging networks, data networks, etc. whose access device on the network serve as the destination to which the transmission or communication is directed from the calling party.

In addition to transmitting voice through the telecommunication network 10, the voice may be converted into digital form in a conventional manner, e.g., compressed into data packets or sampled. At the first central local node 18, the call from the calling location 12 is converted to a data signal which is then sent over a data network such as the data network 20 to the called location or destination 14. Prior to reaching the called party, the data signal is reconverted into voice at the central office 22 (or control location) to be transmitted to the destination 14 via a public communications network or other connection line 36. Such a transaction bypasses the use of the international telephone networks and utilizes local calls instead. All internode connections are via the data network.

In addition, by transmitting voice over a data network, the need for callback over a telephone network to save costs is obviated. Since data transmissions are virtually instantaneous, the costs associated with the waiting times for transmitting voice over conventional phone networks is avoided and even the costs associated with waiting times for making connection in a callback over a conventional phone network are avoided.

Each node is capable of communicating with other nodes for purposes of routing the communication and act as a transit node, making inquiries to determine availability of the party at the destination to receive the communication, and even tracking down which network the party is presently accessing so that the communication may be routed there. For instance, a node at the called party may be preprogrammed with all different forms of communication networks and contact identifications that the party may be accessing, together with their addresses, access numbers, or other types of identification information to access them from the node.

Upon receipt of a request inquiring as to the availability of the party to receive a communication, the node at the called party having the main identification or number associated with the called party checks the status of each of these communication networks at different access locations to determine whether any are being accessed by the party at that time. In this connection, the called party would have previously designated the main identifications (addresses, etc.) or phone numbers where it wants to be reached and what networks are to be employed.

For instance, the check may reveal that the called party's computer is logged in or that the phone is hooked up, etc. If so, then the node has identified where the party may be accessed and then contacts the inquiring node to forward an authorization code for billing credit purposes so that the called party node may effect communication through this identified communication network. The authorization code limits the duration and services that may be provided. Alternatively, the system may send the authorization code together with the inquiry.

The node that made the inquiry request sends the authorization code after checking in with a central node responsible for clearing all transactions and which registers every event on the network. The central node may be part of a distributed network of central nodes that are responsible for billing. After the called party node receives the authorization code and authenticates it for billing purposes, communication may be established to the party through the identified communication network that was tracked down and found to be accessible all transparent to the end user. An appropriate signal is transmitted to the requesting node that communication may commence between the parties.

An example of tracking down the called party will now be described. Assume that the party spends half the year in North America using NACN cellular network and the remainder in Europe using GSM internet network hookup using Laptop computer. Under normal situations, these two forms of networks are not compatible so direct communication is not possible. However, in accordance with the invention, such a situation is rectified by communicating with a node that is programmed with information as to which of the possible networks the party may be using. If the node is in contact with the NACN system, it is also in contact with a node that is in contact with the GSM system Both nodes check their respective cellular systems to locate on which the party is or has been accessing or which has been turned off. Once the accessible location is identified, contact can be made from regular telephone to the laptop network and routing the voice over data to the laptop on which it is converted back into voice.

As an example of operation, the subscriber of the service provider first contacts a central local node by providing the calling party's identity access number or identification and the called party access number or identification, as well as the type of service desired as concerns routing preferences, service providers, level of transmission quality, timing of transmission, etc.

The central local node polls the called party nodes to locate the network which the called party is accessing. For instance, one called party node may be programmed with access information on all the possible networks that the called party may be using, e.g., cellular, computer, paging, etc. This called party node then searches to find where the called party is or is likely to be and then informs the central local node that the communication may be sent to it upon receipt of an authorization number for the transaction.

The central local node provides such authorization, perhaps after checking with the central node first that handles billing and determining that the calling party or service providers satisfy financial conditions for permitting service and future settlement. If the central local nodes do a least cost routing analysis, for instance, and determine that a callback from the called party is the cheaper way to complete the transaction and both the calling party's service provider and called party's service provider has received authorization, then the originating service provider will be billed. The central node records all such transactions for billing purposes.

One application of the invention that allows the Internet or other data network to function like a telephone and fax machine will now be explained. Callers are allowed to dial anywhere in the world for the price of a local access and service fee and avoid using long distance carriers. Users may make such calls to have voice conversations and to send faxes to remote locations. For making voice calls, a local system is dialed via computer access or regular phone which prompts the users for the called party number or identification and then connects them to the called party over the Internet or other data network, such as by connecting them via a node through a local call or through other networks. For example, a calling party may access a node that converts the transmission into data to support the network that it chooses. For instance, it may connect to another node that converts the transmission into voice and then connects the communication into a local call to the called party with the called party node being operated by an independent service provider located elsewhere such as in another country. Of course, the connection takes place only after authorization is received to complete the local call.

For sending faxes, the calling party sends a fax into a central local node and the fax is then forwarded to the called party over the Internet or other data network. The fax may be sent in real time or as a store and a forward mode for later sending as part of a subsequent batch transmission, depending upon the preferences of the calling party.

The present invention envisions the option of using a single communication device, such as a multimedia laptop computer, to initiate and receive all forms of communication by contacting a node or being contacted by a node in accordance with the invention and providing it with an identification access address and a called party access address, phone number or other type of identity code and any preferences concerning the transmission, such as level of quality of transmission, service providers, time of cost, transmission (e.g., real time or store and forward later), security, encryption, etc.

Transparent to the calling party that is using the laptop, the node takes care of all further action such as tracking down the called party, handling financial billing and obtaining authorization for completing transactions via individual remote service providers, determining the preferred path to route communications even if over otherwise incompatible networks by converting the transmissions accordingly, checking the level of quality of transmission and making sure the transmission satisfies preferences.

In addition to having access to a data network, the laptop may have appropriate software/hardware that give it access to a cellular digital packet data and, via a built-in fax modem, to a phone network. Thus, the laptop may be in contact with the node through any of these different communication networks and communicate over any of these communication networks as well, including performing two way voice calls.

Other applications of the invention concern transmissions through conventional switched frame relay, conventional switched asynchronous transfer mode and other conventional data networks such as the Internet. Frame relay is an international standard for efficiently handling high-speed data over wide area networks that uses network bandwidth only when there is traffic to send. Asynchronous transfer mode allows users to combine voice, video and data on a single phone line and operates at up to Gigabyte-per-second speeds in which usable capacity is segmented into fixed-size cells each consisting of header and information fields allocated to services on demand. The Internet network differs from frame relay switching and asynchronous transfer mode by using internet protocols such as transmission control protocol/Internet protocol (TCP/IP), which is a set of protocols developed by the Department of Defense to link dissimilar computers across a variety of other networks and protocols.

Figure 2:
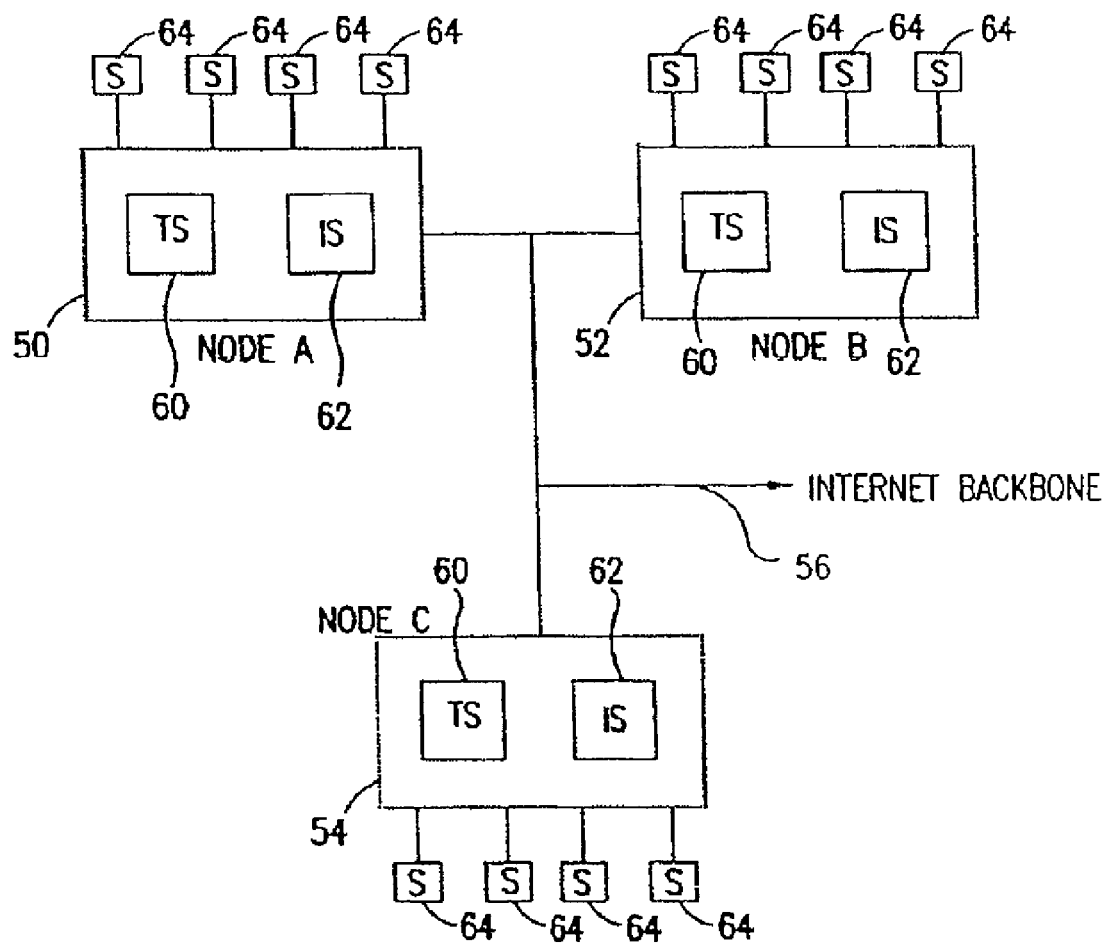
FIG. 2 is a schematic diagram of a system overview having two servers at nodes connected to an Internet backbone.

Referring to FIG. 2, several remote nodes 50, 52, 54 are shown on the Internet backbone 56. Each remote node has a telephone server 60 and an Internet server 62, although a common server may be used instead to provide both functions. The Internet server 62 has access to the Internet backbone 56. Both servers 60, 62 are networked using transmission control protocol/Internet protocol TCP/IP, which is a set of protocols that link dissimilar computers across a variety of other networks and protocols as conventionally used on local area networks, minicomputers and mainframes, or are networked with a router in the case of an ATM. Subscribers 64 dial into and are serviced by the telephone server 60, which is a computer based machine with conventional voice and fax processing hardware and software, so as to establish a connection with one of the remote nodes. Subscribers access the servers by using any of the conventional off-the-shelf phone and fax machines.

Figure 3:
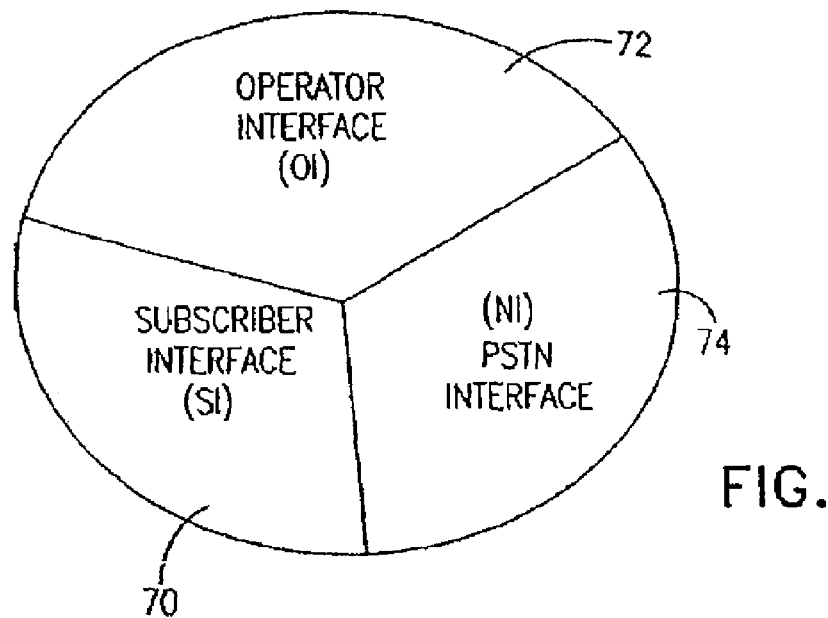
FIG. 3 is a schematic diagram of a telephony server.

Referring to FIG. 3, a calling party interface 70, operator interface 72 and a public switched telephone network PSTN interface 74 are shown. The subscriber interface 70 provides subscribers or calling parties with internet phone and fax service via the Internet is Server 62 of the remote nodes (see FIG. 2). The calling party may dial into the subscriber interface 70 through voice or data lines, for instance, with a computer or laptop. The PSTN interface 74 has lines that are used for inbound calls and lines that are used for outbound calls. These lines for inbound calls lead to industry standard dialogic hardware or a modem such that when a particular number is called, the identification or password of the calling party is checked for validity of identity.

If determined to be valid, the calling party is requested to indicate what service is desired so that the communication may be routed accordingly over voice or data networks. The called party is contacted to determine availability for receiving the communication. If available, communication is established over the desired service. Otherwise, if real time communication is desired, the calling party is notified that contact is unavailable.

If store and forward is the desired method of communication, then the called party is monitored until contact becomes available, at which time the communication may be transmitted. A store and forward type communication is one in which a desired communication, such as a telecopier transmission, is stored until it may be sent in accordance with other criteria, such as in batch format at off peak rates.

Voice processing entails call processing and content processing. Call processing involves physically moving the call around such as through switching. Content processing involves actually interacting with the call's content, such as digitizing, storing, recognizing, compressing, multiplexing, editing or using it as input to a computer program.

The operator interface 72 includes designated representatives of the service provider to interact with the system by means of a personal computer console to perform essential functions such as subscriber administration, rate schedule management, billing and system administration. These functions are remotely accessible by dial up.

Figure 4:
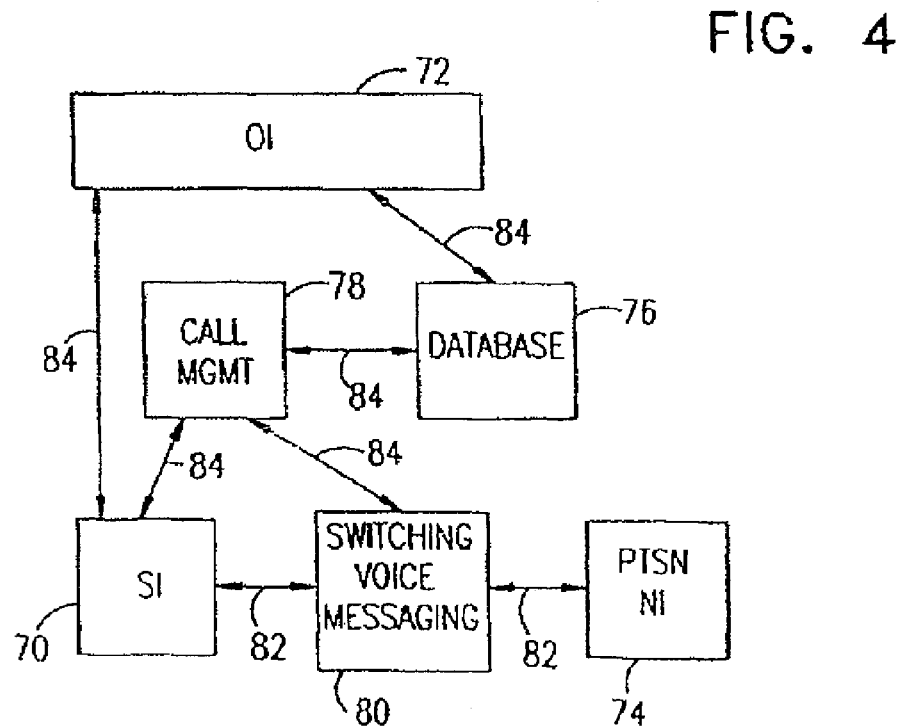
FIG. 4 is a functional block diagram of the embodiment of FIG. 2.

FIG. 4 shows the functional hardware in accordance with the invention. In addition to the previously mentioned fundamental external interfaces, the internal functional blocks that are necessary for the present invention include, as represented by blocks in the diagram, a data base 76, call management 78, switching, voice and fax messaging 80. The horizontal links 82 on either side of the switching and voice messaging block 80 are voice paths. The remaining links 84 are all data flow paths.

The data base 76 is a database management system that is used as a repository for subscriber information, rate schedules, call details, and configuration information required to operate the system and the franchise. Switching via block 80 is required to establish voice or fax between the source and the called party. Pre-recorded audio messages are played back onto a voice pathway by voice messaging for purposes of greeting, indicating normal call setup progress, and checking system load status, subscriber account status, and error calculations. Voice messaging refers to a small set of system wide messages and not to arbitrary voice mail messages.

Calls originating from the PSTN interface side are detected by the switching voice messaging block 80, which also communicates with call management 78 to establish a link with the called party node via the Internet server 62 of FIG. 2 or a voice or data line and to determine which message to playback if any. The call management 78 handles call set up requests from either the subscriber interface 70 side or PSTN interface 74 side to issue call set up commands to the subscriber interface 70 and to the switching voice messaging 80. It maintains status information on the subscriber interface and PSTN lines. The call management 78 is configurable to verify credit availability before setting up a call with other nodes if necessary, and monitor the call to issue voice messaging and call termination commands upon credit depletion. It handles call take down situations by recording call detail information in the database for eventual billing purposes and issuing relevant commands directly to subscriber interface 70.

For establishing a call, the following steps may take place:
The dialogic hardware answers the call. The switching voice messaging 80 sends a message to the answered call via the voice processing unit requesting entry of a called party access number, which after its entry is received and stored. The call management 78 checks the data base 76 for the user's billing status. If invalid, the voice processing unit plays a message and the call is disconnected. Otherwise, for valid callers, the call management 78 initiates the subscriber interface 70 to send a request packet over the Internet other data or voice line; the request packet consists of the called party number or identification and may include an authorization code.

Upon receipt of the packet at a remote central local node, the remote central local node will dial the called party number or enter its address, perform a call analysis and send the result back to the subscriber interface at the origination node. Call management 78 checks the analysis result. If a connection link was established, then the call begins. Otherwise, the switching voice messaging 80 prompts the user via the voice processing unit with a message and options, such as dial another number or leave a message in a voice mailbox. Upon completion of the call, billing information will be stored in the data base 76 for further processing by the operator interface 72.

Figure 5:
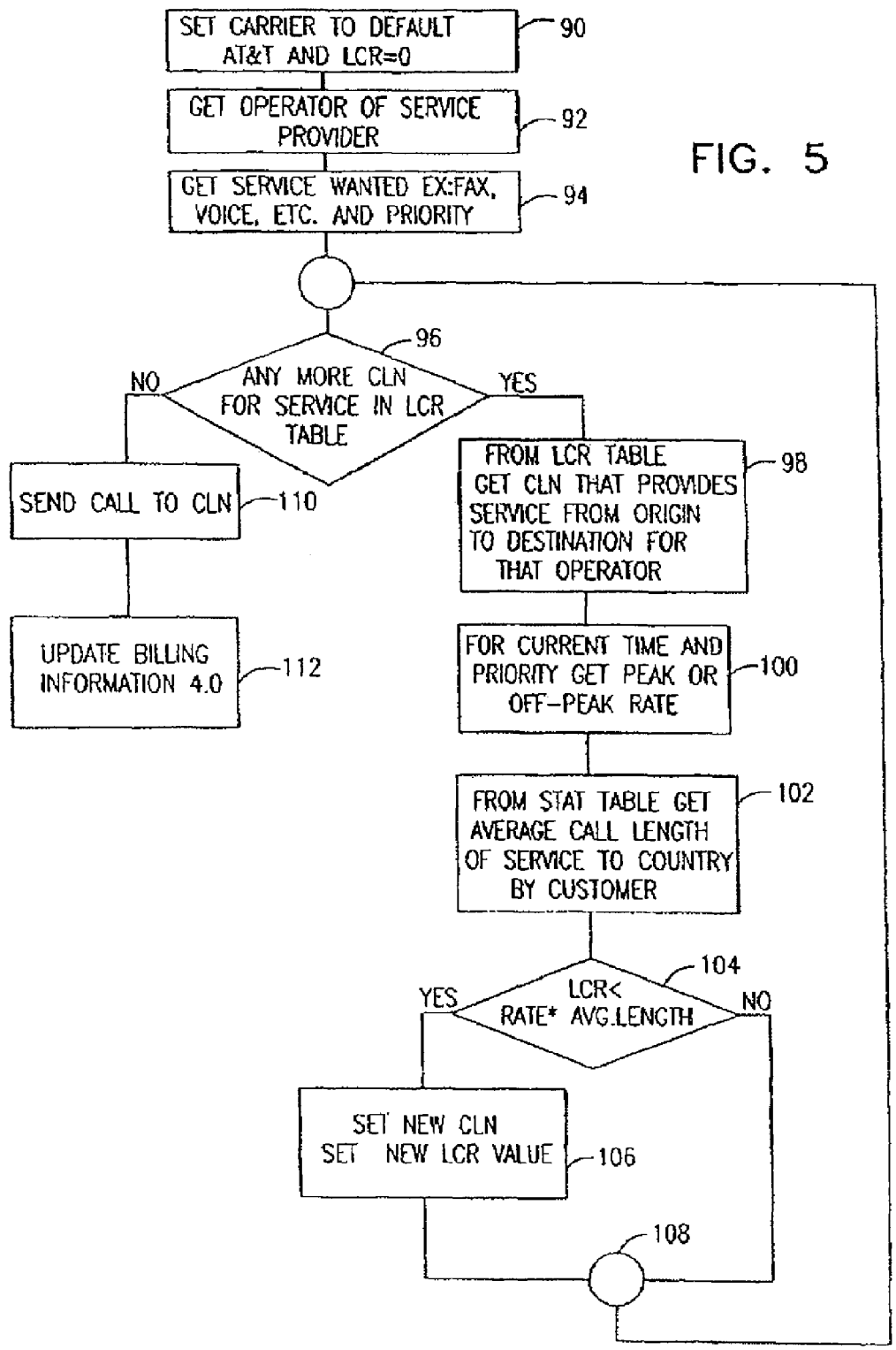
FIG. 5 is a schematic diagram of a flow chart showing routing for versatility and priority of transmission.

FIG. 5 illustrates a technique for gaining access to a greater number of telecommunication networks. The normal transmission from an access device is intercepted by an intercept device, which routes the transmission to a central local node. At the central local node, an investigation is made as to what route is available for the specific service.

After determining which route is available, the central local node determines all available nodes that can provide such a service for the called party end. The central local node then selects a specific available node based on considerations such as cost, line quality and security and priority. The central local node checks with an internal data base to determine the available networks at the called party end, the identity of the service providers who provide those networks across different nodes, and the different transmission costs associated with customer defined criteria. The network access devices supported at the called party end could be a telecopier, telex, voice telephone, cellular phone, radio phone, data entry terminal, etc. (different types of communication access devices). Transmission costs associated with customer defined criteria include customer preference for particular types of networks, encryption security, and/or priority of transmission such as transmit in real time or in a store and forward format as defined in the customer's message.

A software defined network may be used to maintain quality (e.g., upon detection of degradation in quality, the bandwidth of the transmission may be widened in accordance with or prioritization of transmission instructions). If data packets do not arrive quick enough, then quality may be enhanced by increasing the bandwidth within predetermined bandwidth parameters on account of other voice data users.

Another embodiment of the application of this invention concerns security. A calling party may prefer that the transmission take place over a secure, dedicated line, but does not is care about the route taken by the acknowledgment or reply to the transmission. As a result, the acknowledgement or reply may be routing over non-dedicated lines and through any communication networks, even from among selected networks of the calling party's choosing. For instance, the calling party may want the acknowledgement or reply to be routed over either cellular or computer network services.

In accordance with the invention, such customer preferences may be found in the data base associated with the calling party and interpreted by the central local nodes. The central local nodes then instruct nodes responsible for the routing back of the reply or acknowledgement to follow the desired preference.

Another example of the application of this invention relates to a customer's preference that a telecopier message be transmitted immediately instead of in delayed batch format or vice versa. The telecopier message is sent to a central local node (at the origin). After initializing the system, i.e., setting a carrier default 90, checking customer preferences for an operator of a service provider 92 and checking customer preference for selecting the desired service 94, the central local node determines 96 if there are any more central local nodes (CLN) from a least cost routing (LCR) table, which contains a list of central local nodes connected with service providers of different networks and their costs for providing service.

If there are more central local nodes, the next one is selected 98. A determination 100 is made as to whether peak or off peak rates apply by basing it on the current time. Reference to a data base table 102 may be made to determine the average call length of service to the location by the customer to help figure out the most cost efficient route based on history of usage. A least cost routing comparison 104 is made to determine whether the new central local node's connection to the service provider offers the more favorable rate based on the average length of communication that what was being offered through the previously considered central local node. If better, the newly considered central local node (and its associated service provider) is selected. If worse, the previously selected central local node (and its associated service provider) will remain selected.

This process is repeated 108 for each central local node and thereby each service provider. When done, the format of the call, the appropriate service provider, network and time of day are selected for sending the transmission to the selected central local node 110 and the billing information is updated 112.

By selecting the appropriate network, it may be ascertained that it is less expensive to transmit the telecopier message in digital form over a data network than to transmit the telecopier message in voice callback format through the long distance carriers. Thus, the data network may be the network of choice for purposes of selecting the least cost between nodes. On the other hand, the central local node should give priority to the customer's preferences, which could mean that the transmission be routed through the most secure route which may not be the data network Instead, a secure transmission would be through a different routing and would result in an increase in transmission cost.

Figure 6:
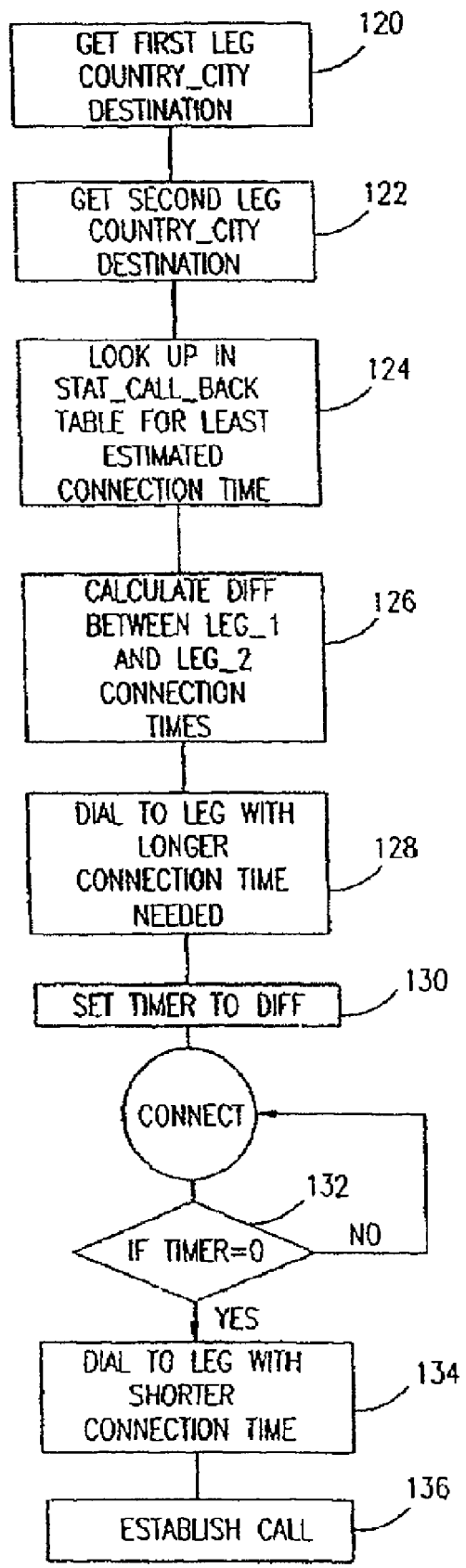
FIG. 6 is a schematic diagram of a flow chart showing synchronizing connection.

FIG. 6 shows a flow chart for establishing a synchronized connection of both call legs, that is, synchronizing the completion of callback and called party communications by selecting specific system time and speed of callback time. A user is allowed to stay on a line or hang up to wait for a callback while the routing unit time the completion of both communications from the routing unit to the calling party access number and the called party access number and ensures that both occur simultaneously or according to cost efficiency of transaction. The routing unit checks an internal data base to determine how long to wait before commencement of opening communications with both so as to ensure synchronization of the callback and called party calls. This may be based on the historical performance of placing the callback and called party calls or placing a data call or tracking down a party.

A routing unit initially receives the first leg 120 (location, city, destination) of the calling party and the second leg 122 (location, city, destination) of the called party and then looks up in a status call back table in memory 124 for the least estimated connection time. The difference 126 is calculated between the connection times of the two legs and the leg with the longer connection time needed is dialed 128. A timer 130 is set to the difference and counts down to zero 132.

When the counting down is completed, the timer triggers the actuation to open communication with the leg with the shorter connection time 134 to establish the call 136. If a called party is to be called that is not found in the status call back table in memory 124, then the actuation to open communication takes place in the sequence of the called party leg first and then the other leg. The average connection times are then stored in the table in memory 124 for future synchronization of the two legs. The table is continuously updated every time calls are placed. The average connection times for both legs and the service providers that are available for connection to the called party location and city codes are stored in the table for retrieval upon demand.

Another aspect of the invention concerns blocking the channels so no other incoming calls can interrupt during the time the routing unit performs the callback and called party calls. The intercept unit only releases the blocked channel a few seconds before the time specified in the history of completion of the callback and called party calls. Alternatively, the time delay may be based on a fixed minimum time period common for placing those types of calls. For instance, if a long distance call takes 10 to 15 seconds depending upon the called party, the time delay period that is set could always be 9 or 10 seconds under the time required to make that call.

Thus, there is only a short time period during which an incoming call can interrupt the routing unit's synchronization of the completion of the callback and called party calls. It should be noted that the data base checked by the intercept unit may not be the same data base checked by the routing unit, although their contents could be the same. Such call blocking features are commercially available from VoiceSmart in software and hardware under the designation transparent local node (TLN) and hotel local node (HLN). By blocking such incoming calls, service providers no longer face the risk of bearing the expense of completing the second callback leg if the first callback leg becomes busy due to an incoming call.

FIGS. 7A-7G exemplify different techniques for efficient routing communications in accordance with the invention. Access devices 150 and 156 (FIGS. 7A-7G) and nodes 152 (FIGS. 7A-7C, 7E-7F), 154 (FIGS. 7A-7G) and 160 (FIG. 7C) on a network are shown, but each node may be located in the same or different geographical region or country. The access device 150 may have an intercept capability to render the ensuing routing connections transparent to the users. Node 158 (FIG. 7B) represents an access device on a different network. For purposes of example, links 170 (FIGS. 7A-7G) and 174 (FIGS. 7A-7G) may be considered voice transmission lines and links 172 (FIGS. 7A-7C, 7F) and 173 (FIG. 7D) may be considered data transmission lines. Link 176 (FIG. 7B) may be a paging or cellular line. Links 178 (FIGS. 7E and 7G) and 180 (FIG. 7E) may be data lines. Links 182, 184 and 186 (FIG. 7F) may also be data lines. Each node may perform the function of terminating the call, such as when authorization is not forthcoming for carrying out the transaction.

Figure 7A:
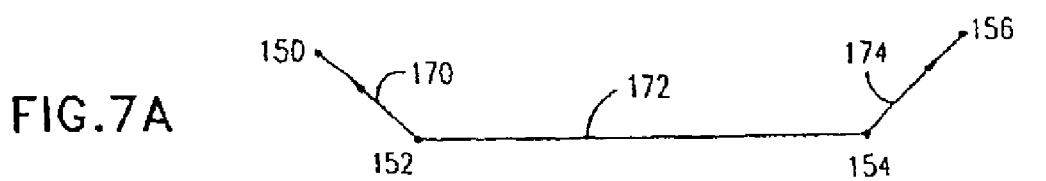
FIGS. 7A-7G are schematic diagrams showing different types of communication routing techniques.

FIG. 7A shows nodes 152 and 154 effecting communication with their respective access devices 150 and 156, as would be done for simultaneous callback Initially, the initiator access device 150, transmits its identification and that of the other access device 156 to node 152. Node 152 requests node 154 to make an inquiry on the availability of access device 156. If available, then callback is made over respective links 170, 174, preferably for simultaneous communication. The two callbacks are bridged over link 172. Nodes 152 and 154 convert voice transmissions into data transmission and vice versa so that data transmissions travel between nodes 152 and 154 and voice transmissions travel from the access devices to the associated nodes 152, 154. Links 170, 172 and 174 may handle voice or data communications.

Figure 7B:
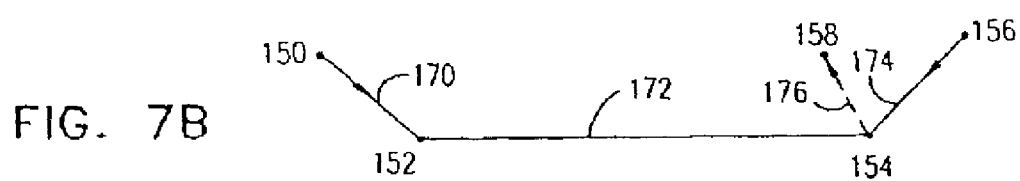

FIG. 7B works in the same way as in FIG. 7A, except that node 154 pages the called party via paging device 158 over paging network 176. Once paged, the called party calls node 154 through access device 156 and communication is established by bridging over link 172. During the interim between paging of the called party and the calling to the node 154 by the called party through the access device 154, the access device 150 may either be waiting for communication to be established with node 152 or be called back by node 152 after node 152 is advised that the access device 156 has contacted the node 154.

Figure 7C:
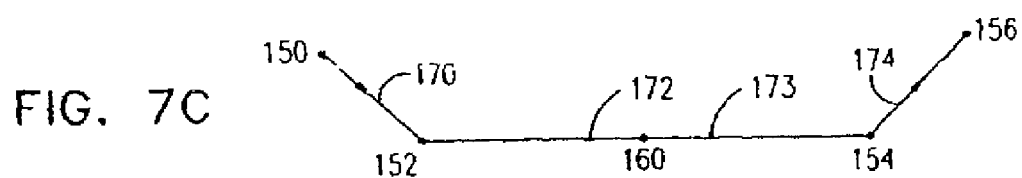

FIG. 7C is the same as that of FIG. 7A, except that an additional node 160 between nodes 152, 154 is shown to illustrate that the routing between nodes 152, 154 may not be direct, and also showing that access device 150 is communicating directly with node 152 rather than as a result of callback as in FIG. 7A and using two different data links 172 and 173.

Figure 7D:
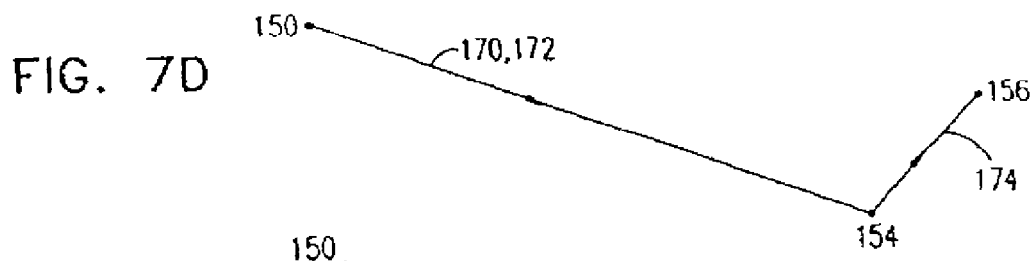

FIG. 7D shows that communication may be through a single node 154, rather than through two nodes as in FIGS. 7A-7C as in case where access device 150 is a computer that has direct access to data link 172.

Figure 7E:
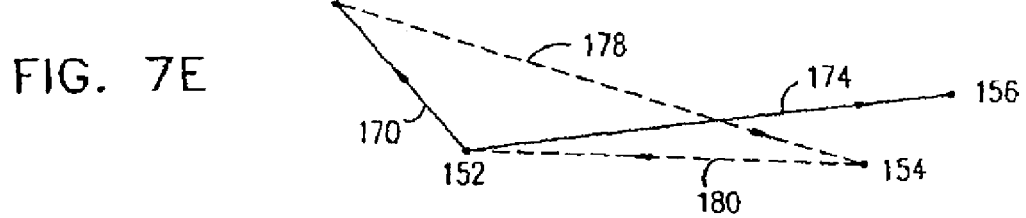

FIG. 7E shows also that communication may be through a single node 152, rather than through two nodes, but also shows that such communication is established after access device 150 communications with node 154 say through E-mail that communication is desired with access device 156. Instead of routing the transmission through node 154, node 154 signals to node 152 to make contact with access devices 150 and 156 directly.

Figure 7F:
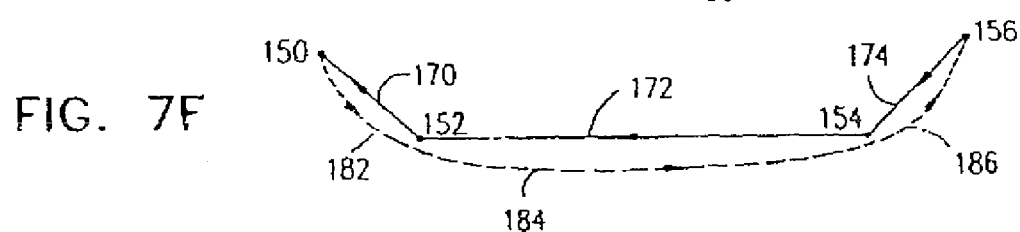

FIG. 7F shows a callback type of arrangement in which a request for establishing communication from access device 150 to access device 156 is made through one kind of network, but the actual callback is done over a different kind of network, although both kinds of networks share the same nodes 152, 154. As an example, the request could be through a data network 182, 184, 186 and the callback could be through two voice links 170, 174 from respective access devices 150, 156, with the two voice links being bridged by a data link 172. The nodes 152, 154 convert voice transmissions into data transmissions and vice versa as desired.

Figure 7G:
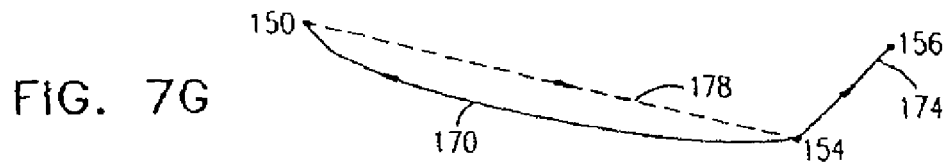

FIG. 7G is the same as FIG. 7E, except that node 154 also performs the function of node 152 in FIG. 7E and thereby routes the transmissions through itself. In this case, a request for establishing communication with access device 156 from access device 150 is effected over a data link 178, such as through E-mail. In response, node 154 calls both access devices 150, 156, preferably so that each is contacted simultaneously, over a different network such as over voice lines 170, 174.

In each of these examples of FIGS. 7A-7G, billing is handled transparent to the parties using the access devices 150, 156. Each of the nodes are in contact with a central node (or network of central nodes) that must clear the transaction before the termination nodes take action through a global authorizer. Once the transaction cleared, an authorization code is provided to the node. The authorization code may either be forwarded to some other node at the time a request is made to establish communication or may be in response for such from that other node.

The central node, which includes the global authorizer, would check the total open credit or debit for the originating node, check for patterns of fraud, check for rights to terminate communication early based on available credit, and check the calling party credit standings with third parties. Based on the results of such checking, the global authorizer of the central node either approves or disapproves of the proposed transaction. Once the transaction is complete, the node responsible communicates such completion to the central node, which then updates account information accordingly. If a node is being shut down, the central node also communicates such shutdown to all other nodes so that they remove the shutdown node from the stored routing table of available nodes.

Figure 8:
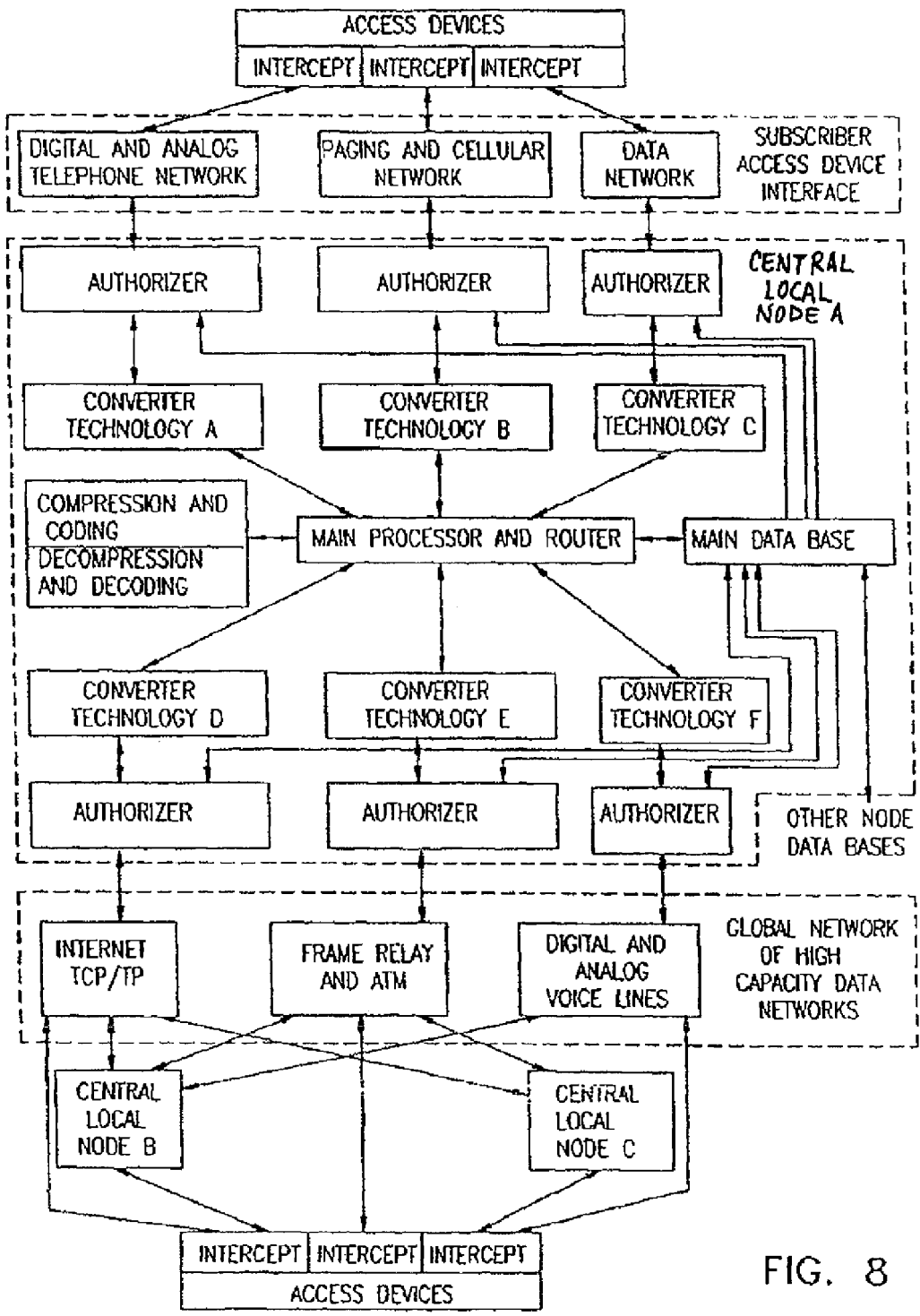
FIG. 8 is a schematic representation of a central local node interacting with networks in accordance with the invention.

FIG. 8 shows a central local node A interacting with a calling party access device interface and a global network of high capacity data networks. Access devices may communicate with central local nodes directly or through intercept devices which direct the communication to the central local node. Access devices are exemplified by telephones, pagers, cellular phones, laptops, facsimile machines, multimedia computer workstations, etc.

The subscriber access device interface includes communication networks such as digital and analog telephone, paging and cellular, and data. The central local node includes an authorizer, converters for each communication network, a main processor and router, a main data base, compression and coding system and decompressing and decoding system. The global networks of high capacity data networks include the internet, frame relay and digital and analog voice lines.

The authorizer is responsible for providing clearing transactions to provide authorization for making communication. The authorizer checks with a main data base within the central local node to determine whether the subscriber's credit is good and to what extent to ensure that service providers get paid. The data base may contain a history of the subscriber's usage and outstanding unpaid balance and other information relating to credit history. The main data base's information may be updated from information in other nodal data bases and vice versa, including that of the central node, which should contain the most current information and whose global authorizer may be responsible for authorizing all transactions in advance. By the same process, the global authorizer can check on the creditworthiness of service providers if the service providers will be responsible for paying each other.

The converters convert the form of the communication to suit the particular network over which the communication will be routed, e.g., voice into data, etc. The main processor and router is responsible for checking with the main data base to determine which service providers and communication networks to utilize and to access circuitry to compress or decompress the communications as needed and to access circuitry to code or decode the communications for security purposes.

The main processor and router route the communications through appropriate converters if necessary to suit the network being utilized for routing, i.e., internet, frame relay and ATM, or digital and analog voice lines. The main processor and router also direct the communication to the ultimate destination, i.e., access devices of the called party. In so doing, other central local nodes B or C may be used for part of the routing or else route directly to the access devices via the associated intercept if any for the access device. These intercept devices are also for directing communications.

Converters are available conventionally, such as Texas Instrument digital signal processors which convert voice to data and vice versa. Intercepts are available from VoiceSmart by ordering TLN or HLN and are available conventional from phone companies. The intercept may be part of or separate from the access devices. The intercept evaluates whether savings may be achieved by routing to a node and, if so, routes the transmission to the central local node A of FIG. 8 and identifies the subscriber and called party or service type.

The node receiving the routing from the intercept polls other nodes to trace the called party number or identification address. In this manner, the main processor and router of the node serves as an interrogator that interrogates the availability of the called party number or identification address. The node accesses a main data bank to check the communication network, call format and user preferences to determine the best connection between locations 150 and 156 of FIGS. 7A-7G. The node, through its authorizer, checks whether completing the routing of the transmission is authorized and obtains an authorization code from the global authorizer at the central node. The node converts the transmission if necessary for compatibility and records billing information to ensure proper end user billing. Also, the node updates user statistical usage and access for future use. Each of these tasks that are performed by the node are carried out in a manner that is transparent to the calling party.

Figure 9:
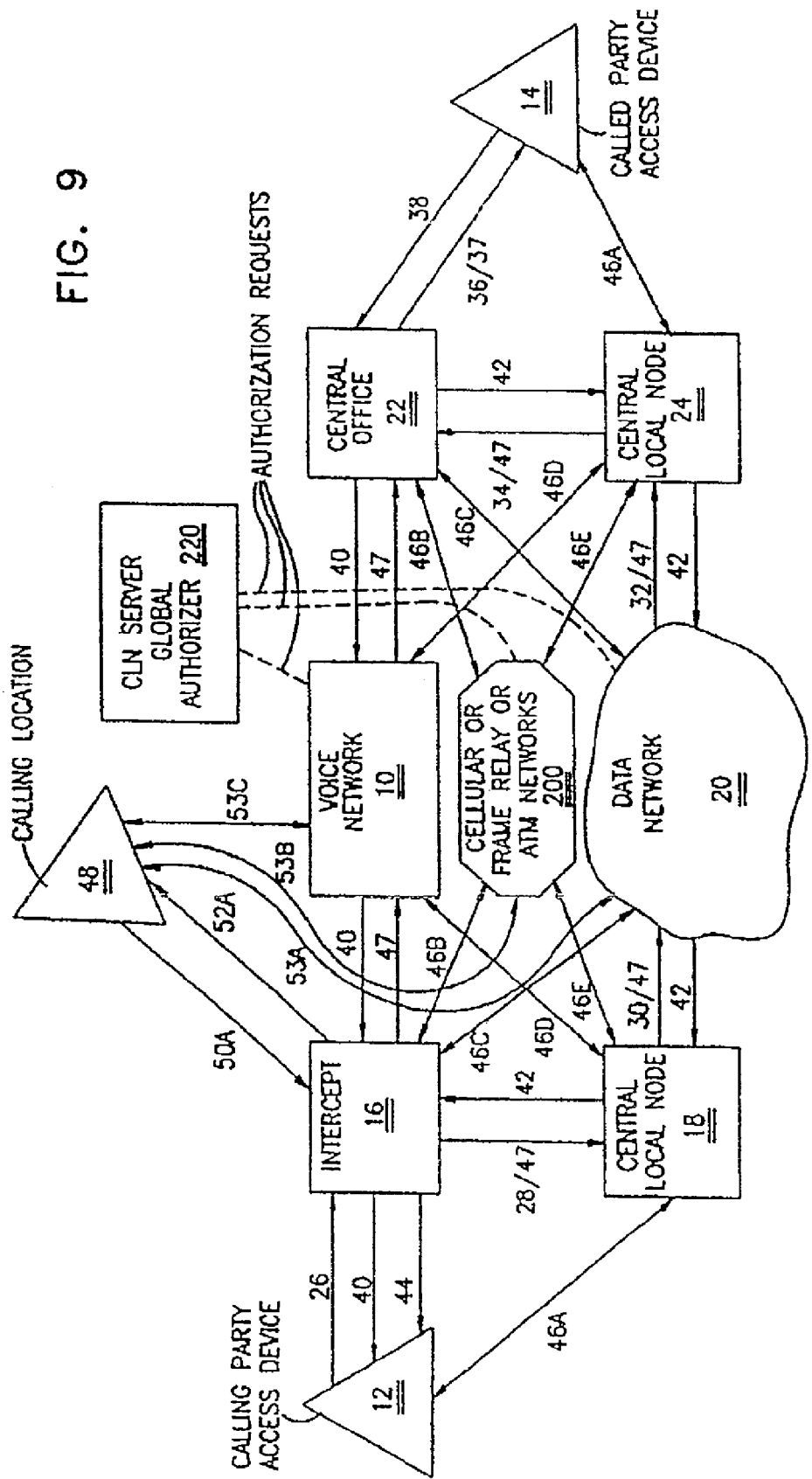
FIG. 9 is a conceptual block diagram that is a further variation of that of FIG. 1.

FIG. 9 is a variation of that of FIG. 1, but shares the same components that are identified by the same reference numerals. Additional two-way direct link connections 46A, 46B, 46C, 46D and 46E are included. For instance, one route for sending a request as to availability may be from the calling party access device 12 to the local access node 18 either directly or through the intercept 16 and then directly to either the communications network 10, the data network 20 or another network 200 such as a cellular network, ATM, and/or frame relay. The central switching unit 22 then receives the request from the network as to availability to check on the availability of the called party access device 14. Once the availability becomes known, an appropriate signal may be sent directly back to the central local node 18 either backtracking through the same route or through the second central local node 24 to either the communications network 10 or the data network 20 to thereafter reach the local access node 18, Note that the second central local node 24 may be considered a local access node for the called party access device 14.

A central local node global authorizer 220 is shown to which permission must be obtained by confirming authorization requests before routing connections between the calling and called parties may take place. This global authorizer 220 may be part of the central node to which all the central local nodes are in communication. In FIG. 8, for instance, the connection from the main data base to the other node data bases would include connection with the central node and thereby with this global authorizer. Authorization requests would be sent to the global authorizer 220 via the applicable one or more of the networks 10, 20, 200.

All the routing paths of FIGS. 7A to 7G are applicable to the block diagram of FIG. 9. Also, the representation of the interaction of the central local node with various networks as shown in FIG. 8 is applicable to FIGS. 1 and 9.

FIG. 9 shows some links as bi-directional lines and others as two single-directional lines in opposite directions. This was done for convenience and is in no way intended to be limited to one form or the other. Routes may be through any path available, except that the routing through links 53A, 53B and 53C only arises if calling location 48 communicates in a manner compatible with the applicable one of the networks 10, 20 or 200. Otherwise, routing will have to be done through the central local node 18.

If the calling party location uses a laptop computer and thus connects directly with the data network 20 and bypasses the central local node, the path of communication would still pass through either the central office 22 or the central local node 24 before reaching the called party access device 14. At the central office 22 or the central local node 24, therefore, the applicable billing information may be recorded.

While intercept 16 and central local node 18 are shown as separate units, they may be combined together. Similarly, while the central office 22 and central local node 24 are shown as separate units, they may be combined together. By being combined together, a unitary device would provide the functions of both.

The present invention also provides for bidirectional or duplex transmission of multimedia content between access devices of the calling and called parties in a convergent network in accordance with FIGS. 10-25, as disclosed in parent U.S. patent application Ser. No. 12/766,691, filed on Apr. 23, 2010. The quality of transmission is managed through a convergent communications platform, which periodically tests performance characteristics of network routes in operative communication with the platform, categorizes the network routes based on measured performance metrics, and selects network operator whose network characteristics meet the desired quality parameters of a particular multimedia content to be transmitted (e.g., real-time high definition video conference). The management of transmissions is transparent to the end users who will be able to communicate with others regardless of the type of devices or networks the called parties use or subscribe to.

A. Convergent Network

Figure 10:
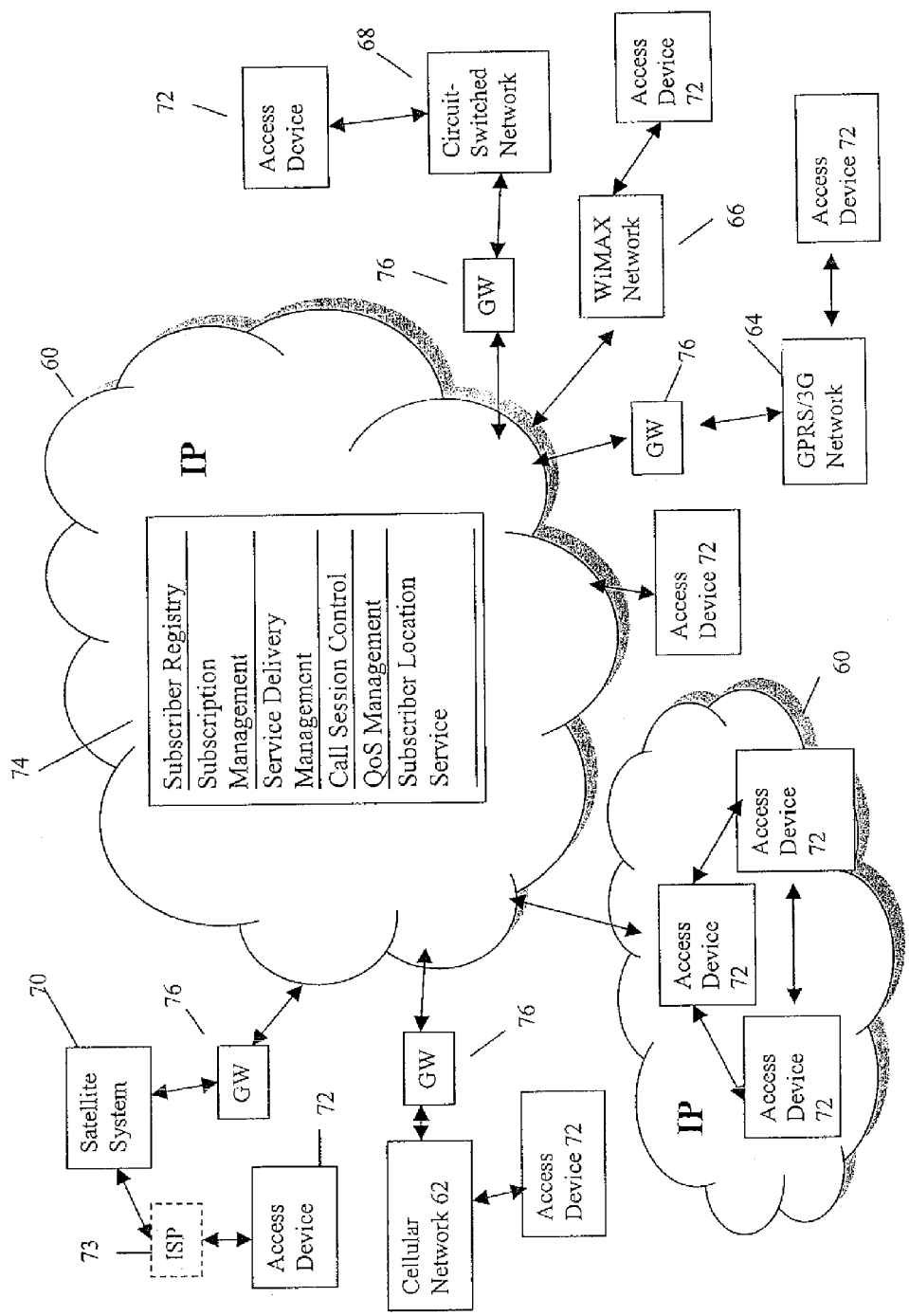
FIG. 10 is a schematic block diagram of the network architecture in which a further embodiment of the present invention is applied.

FIG. 10 shows a convergent network that includes an IP network 60 (such as the Internet), a cellular network 62 (e.g. CDMA, GSM, and IMT-2000), GPRS or 3G network (including the Long Term Evolution (LTE) network) 64, a WiMAX network 66, a circuit switched network 68 (e.g., TDM), and a satellite system 70 (e.g. Low or Medium Earth Orbit communication satellites with low latency). Access devices 72 may be communicatively connected to each other through the convergent network via the IP network 60 and managed by a convergent communications platform 74 (which is described in more details below and may include at least one control node). The access devices 72 may be desktop PCs, smart phones (e.g., iPhone™ or Blackberry® phones), cell phones, fixed line phones, laptop computers, or any computing devices that have either built-in or add-on capability to establish a call session with other access devices 72. The platform 74 may include servers or modules for performing Subscriber Location Service (for locating network locations of subscribers), Subscriber Registry (for storing subscriber profiles), Subscription Management (for managing the subscription levels of the subscribers), Service Delivery Management (for managing delivery of multimedia content across networks), Call Session Control (for establishing call sessions), and QoS Management (for managing the quality of network performance). Gateways 76 are provided to interface, convert signals and media as necessary between networks to resolve any incompatibilities due to different telecommunications protocols and codecs, etc. For example, a PSTN/IP signaling gateway may convert call control signals between IP protocols (i.e. SIP protocol) and SS7 protocols or optionally employ SIP-I protocol (i.e. SIP with encapsulated ISDN) for creating, modifying, and terminating communication session based on ISUP using SIP and IP networks. Multimedia content from the IP network may be transported over ISDN to a circuit switched network 68. It is contemplated that the content (compressed or otherwise) may be encapsulated using ISDN for compatibility with the circuit switched network and which encapsulation may be subsequently stripped and the data packets representing the multimedia content may be processed by the appropriate client application installed on the access device. For another example, the satellite system 70 may be operatively connected to the access device 72 through an Internet Service Provider (ISP) 73 and to the platform 74 via a gateway 76. The platform 74 may also create a peer-to-peer (P2P) network wherein the access devices 72 are facilitated to communicate with each other and share the bandwidth of their local networks. In this scenario, the access devices have a P2P client application installed and the platform employs a hybrid P2P scheme such that the platform contains a registry of the active access devices 78 (i.e. P2P nodes) and directs certain access devices 78 (i.e. Super Nodes) to share network bandwidth based on the bandwidth availability reported by the registered access devices 78. Although the gateways 76 are shown as connected between the IP Network 60 and one of the other networks 62, 64, 66, 68, and 70, a gateway may be connected between any two networks of dissimilar communications protocols such as between the cellular network 62 and the circuit switched network 68.

B. Convergent Communications Platform

In a preferred embodiment as shown in FIG. 10, the convergent communications platform 74 may include the following elements.

1. Session Control Layer

Figure 11:
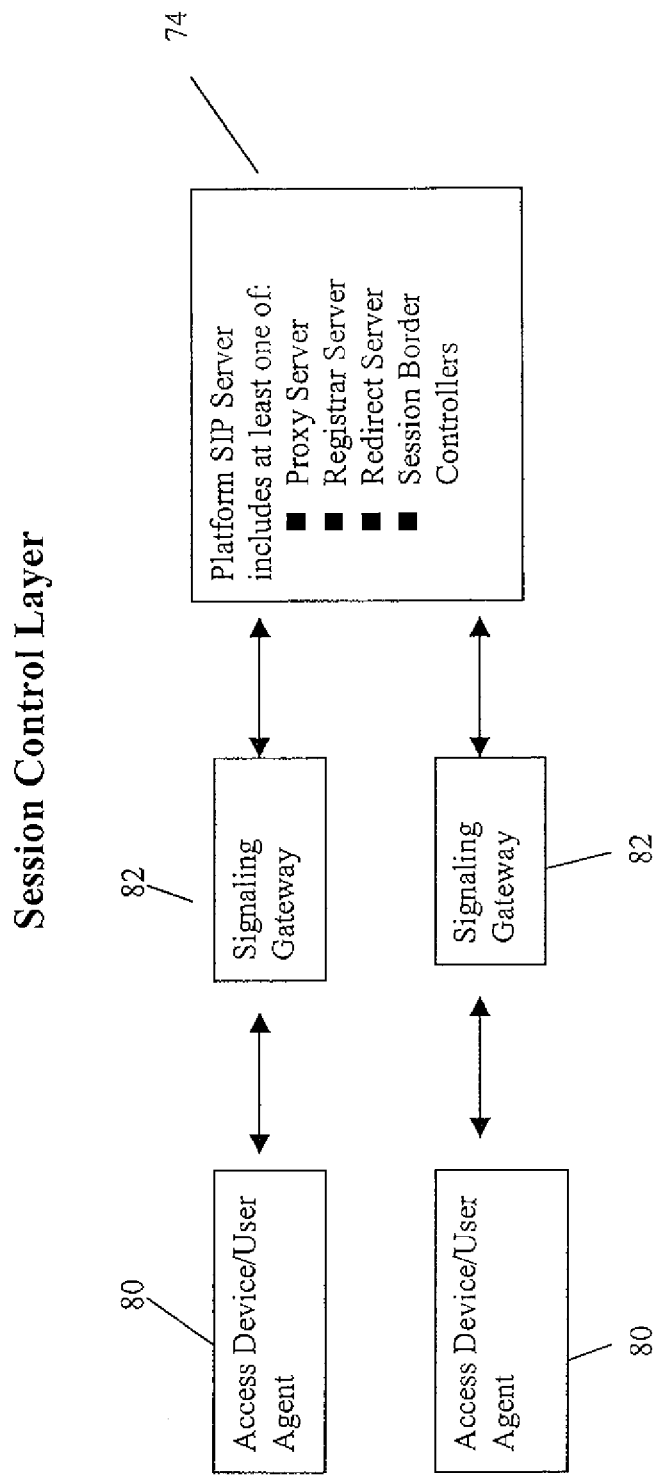
FIG. 11 diagrammatically illustrates an embodiment of the session control layer of the inventive network of FIG. 10.

As shown in FIG. 11, the platform 74 employs a Registrar Server, SIP servers and signaling gateways to manage media session control of the parties. Each multimodal access device 80 may be configured as a SIP user agent so that it may communicate directly with the SIP Servers. Alternatively, the multi-modal access devices 80 may be configured to only communicate with their subscribed or associated networks (e.g. cellular network), and in this case, the call setup messages will be converted by a signaling gateway 82 to SIP messages for processing by the SIP servers on the platform 74.

a. Registrar Server

A Registrar Server is employed to perform subscription management as it receives and registers user profiles and their access devices so that the platform 74 will grant only registered users access to the service. As shown in FIG. 12, it stores in a Subscriber Registry subscriber profiles including information such as their subscription levels (which define the subscribers' level of service, e.g., number of video conference calls allowed per month), their ENUM (i.e. E.164 Number Mapping) identifiers, their network operators or service providers and associated login identifications, if applicable. To register access devices, the users not only enter their registered usernames or their access devices' IDs (e.g., telephone numbers or Uniform Resource Identifiers (URIs)), but may also enter unique product description such as MAC addresses or product brand and/or model numbers of the devices such that the platform can look up or infer the multimedia capabilities and formatting requirements of such devices from published engineering data associated with the MAC addresses and other product description data provided by the users. Users with multiple access devices preferably enter a ranked list of access devices through which they may be contacted. For example, a user may prefer to be initially contacted via his mobile phone, Skype, and then fixed line phone by the platform. Using this information, the platform 74 will contact the user via their access devices in the order specified by the users.

The Registrar Server may also perform Subscriber Location Service if the platform has access to Subscriber Location data (e.g., from network operators) for locating the whereabouts of each registered access device. The Subscriber Location data may be, for example, GPS data in the case of mobile devices provided by the subscriber devices or location of home router or last network device location in the case of non-mobile devices such as desktop PCs or equivalents, or if there is a commercial arrangement with other network operators, direct access to the Subscriber Location service on their networks.

i. Least Cost Routing of a Call Based on Presence Information

In one embodiment, a subscriber with a multimodal smart phone (or any computing device with telecommunications capability that can access a cellular network and an IP network through a WiFi router) enters contact information of friends and associates into the Registrar Server, either direct or via a supporting software application, which contact details would include their usernames or identifiers for an IP based communications service provider such as, for example, Skype ID, AOL ID, Google Voice ID etc. When the subscriber decides to initiate a call (or any future communications session) to one of the registered contacts by, for example, selecting the called party by telephone number or by name using smart phone tools such as, for example, voice recognition or keyboard, the Registrar Server receives the called party information including the relevant IP based communications service provider (e.g., AOL Instant Messenger, Skype, Google Voice ID, etc.) and accesses a database containing the called party's presence information or status (e.g., "online," "away,"

"idle," "mobile," etc.). If a called party is "on-line," the platform instructs the smart phone to set up the call session to the distant IP client (i.e. the called party) through the Internet using an appropriate client application (from the IP based communications service provider) on the smart phone for the call session. This method bypasses the alternative PSTN call flow (e.g., avoiding a call termination by an expensive cellular network), thereby allowing reduced costs of transmission and a more advanced feature set to the subscriber because of the end to end IP nature of the session. The interface to the user preferably remains the same or consistent regardless of how the call is established. If no called party is "on-line" (as indicated by the presence information) the call is routed via their chosen or contracted telecommunications provider (e.g., a cellular network operator) associated with the multi-modal smart phone.

ii. Alternative Least Cost Routing of a Call Based on Presence Information

Figure 13:
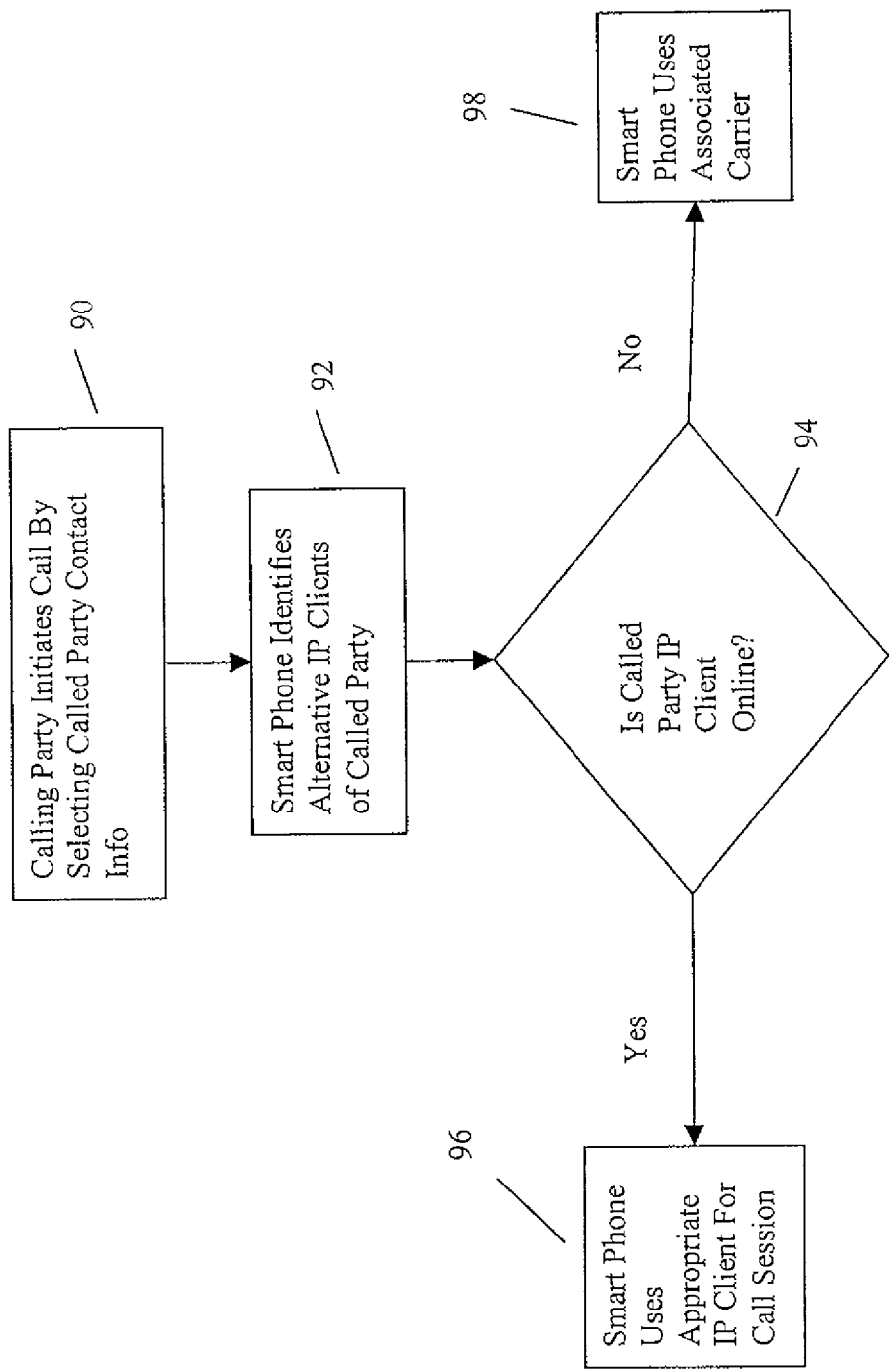
FIG. 13 is a flow diagram of another embodiment wherein a multimodal access device automatically searches for a least cost routing solution for terminating a call.

Alternatively, as shown in FIG. 13, rather than using the Registrar Server, an end user with an access device such as a smart phone enters contact details of friends and associates into the directory or contacts list on the multi-modal smart phone. The contact details include a mobile phone number of the contact and a called party's identifiers for IP based communications network service provider such as, for example, Skype ID, AOL ID, Google Voice ID etc. When the user decides to initiate a call (or any similar point to point communications session) in Step 90 to one of the registered contacts by, for example, identifying the called party by telephone number, or by name using normal smart phone tools (voice recognition or keyboard), the smart phone recognizes that multiple alternative communications protocols are available for the desired contact, checks via the relevant software client(s) (e.g., Skype, Google Voice, or AOL) the relevant presence information indicating availability of the called party in Step 92. If the contact is on-line, the smart phone sets up a call or media session using the applicable client application provided by the IP based communications network service provider in Step 96. This bypasses the alternative PSTN (e.g., cellular network or circuit switched network) call flow, allowing lower costs for the caller and potentially the called party if roaming is involved and permits a more advanced feature set because of the end to end IP nature of the session. Similar to the above implementation using the Registrar Server, the interface to the user is preferably consistent or the same regardless of how the call is established. If the called party is not on-line, the smart phone sets up a media session via it chosen or associated telephony provider (i.e., the mobile operator associated with the smart phone in this example) in Step 98.

In another embodiment, a Private Branch Exchange (PBX), or a switch node for routing communications for an enterprise network, is connected to an IP network and a circuit-switched network and is capable of setting up media sessions with access devices regardless of whether they are in a cellular network, a circuit switched network, an IP network, or any other aforementioned network. The PBX may be configured with a client application to access the services of one or more IP based communication service provider such as Google Voice™ or Skype™ and has access to the login credentials (e.g., login IDs and passwords) of the enterprise users for using the services of such IP based communication service providers. Preferably, the enterprise users provide to the PBX contact details of their potential called parties (e.g., friends and associates) including their telephone numbers and usernames associated with the one or more IP based communication service providers. Advantageously, when an enterprise user selects a called party from his list of contacts, the PBX would first determine the availability of the called party by accessing the presence information (e.g., "online", and "away") provided by an applicable IP based communication service provider the calling party subscribes to. If the called party is available, the PBX proceeds to connect the call using the IP based communication service provider in a manner that is transparent to the calling party (i.e. the enterprise user). Advantageously, the enterprise would realize the cost saving provided by such implementation since any calls made over IP will avoid the termination costs imposed by a typical PSTN operator. If the presence information of all of the IP based communication service providers on the calling party's contact list indicates that the called party is not available, then the PBX proceeds to set up a call session using the telephone number listed by the enterprise caller.

It is contemplated that this technique can be applied to simultaneous call session setups with multiple called parties.

It is also contemplated that the Registrar Server may also maintain a secure on-line backup of all the contact details of a subscriber in case his access device is lost. With the on-line copy, the platform 74 scans all available contacts and keeps an updated mapping of the on-line status of all contacts and all potential clients. When the user makes a call, the application on the smart phone sends a call setup message to the platform 74, the platform 74 then immediately identifies the correct called party to contact if such party is on-line. If no called party is "on-line" via data from an IP based communications service provider, then the platform 74 seamlessly routes the call or multimedia content over a VoIP connection to the called party at the dialed number (using a lower cost retail route plan than the mobile operator) and connect the call.

In yet another embodiment of the platform, a carrier or service provider can lower its cost of termination by querying the Registrar Server whenever it receives a call to a mobile number for termination. If the mobile number matches an available IP client and that client is "on-line," the carrier may convert the call to an appropriate format for the available client and send the call attempt directly, over a quality IP connection, to the client application on the called party's smart phone. This not only sets up a direct IP path to the distant or called party, it also avoids the payment of the normal Mobile Termination Rate (MTR) by the carrier and potentially a roaming charge by the called customer, resulting in a lower cost of providing the service by the carrier which could translate into cost savings for the consumers.

b. Proxy Server

The SIP proxy server handles call sessions initiated by registered users. It authenticates the registered users by looking up the subscriber registry of the Registrar Server and the characteristics of the calling party's access device 72, directly or inferentially from a cross reference product database. It identifies the unique identifier (e.g., telephone number) of the called party and initially determines if it's in the Registry Server's database. Upon receipt of a call request, the proxy server looks up the list of registered users and list of URIs and proceeds to contact each of the URIs in an order that may be pre-selected by the subscriber and as indicated by the Subscriber Registry. If the proxy server contacts the receiving access devices in parallel (provided that is specified by the registered user), it will terminate the call signaling to all other devices when one is deemed available. If the called party is not a registered user or subscriber, the proxy server routes the call setup message directly to the associated network operator and have such operator routes or forwards the call setup signal to the called device.

c. Redirect Server

A redirect server redirects a call session request to another SIP server in a different domain. The redirect server may, for example, be a public WiFi router that receives a call request from a dual mode cellular or smart phone and forwards the request to the proxy server for registered user authentication and call session control and setup. The redirect server may be deployed by an enterprise for handling call setups for devices on the enterprise network and for other functions such as media content conversion.

d. Signaling Gateway

A Signaling Gateway 82 (see FIG. 11) is provided to convert call control signals between different networks such as the conversion of SIP and SS7 messages for circuit switched and IP networks. In the event the platform needs to reach an access device in a different network such as PSTN, the call or media signals will be converted by the Signaling Gateway from SIP messages into SS7 signals and then sent to the access device to determine if it's ready for receiving calls.

e. Session Border Controller

A Session Border Controller (SBC) may be provided to interface with enterprise networks, preferably at the premises of the enterprises and integrated with the enterprise network. In this case, the SBC may direct the SIP messages between the platform and the registered access device inside the enterprise network. The SBC may also perform media content formatting, if required, and media delivery.

2. Service Delivery Layer

Figure 14:
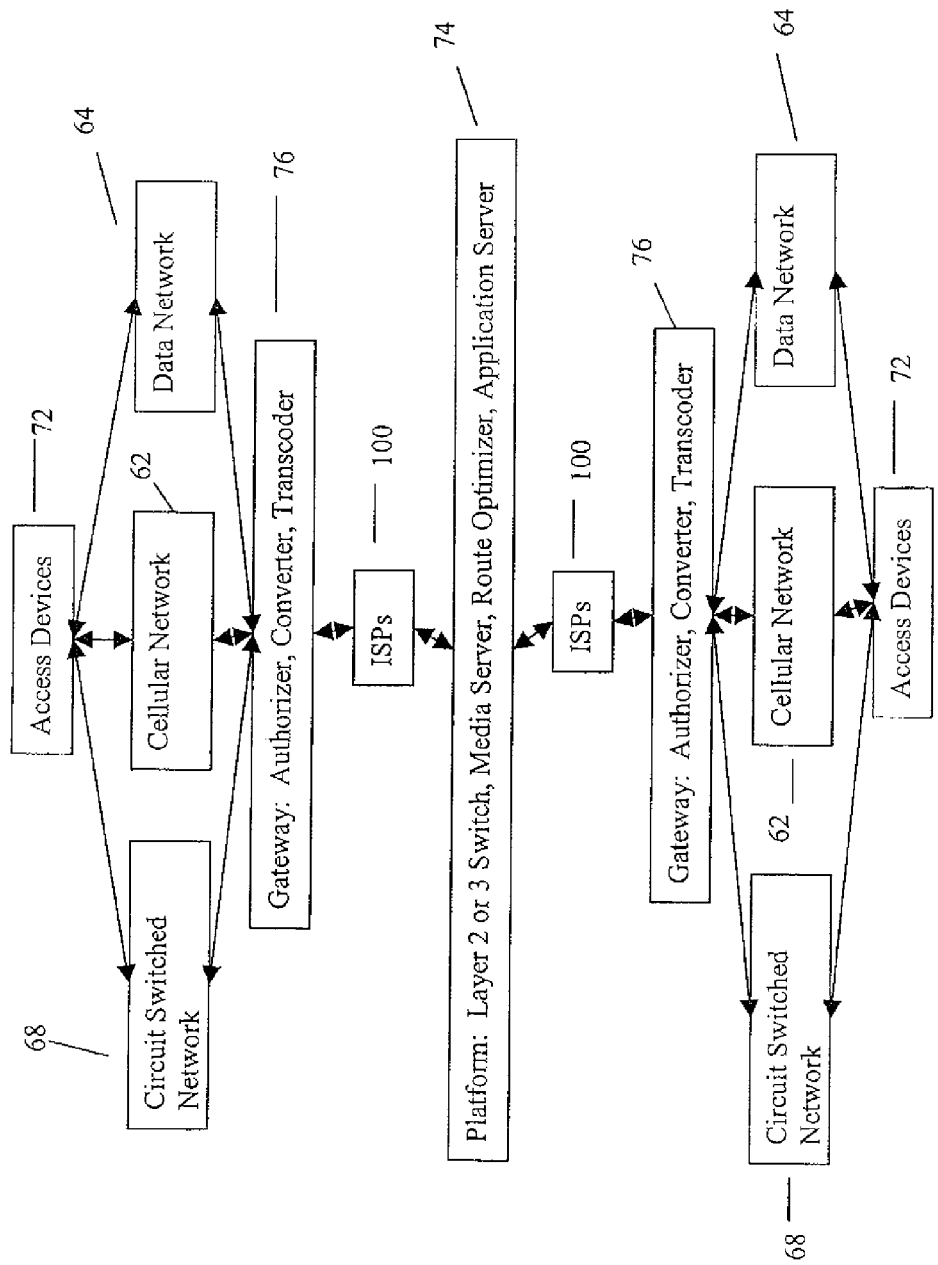
FIG. 14 depicts the service delivery layer of the inventive network wherein multimedia communications are converted across disparate networks between access devices.

FIG. 14 diagrammatically depicts the Service Delivery Layer in accordance with an embodiment of the invention. The access devices 72 may be connected to at least one of a circuit switched network 68 (e.g., TDM and C7), a cellular network 62 (e.g., GSM or CDMA), or a data network 64 (e.g., GPRS/3G network). These networks interface with the gateways 76, which include an authorizer that performs authorization and authentication of the access devices, a converter that converts media content between incompatible formats, and a transcoder that transcodes media content from one compressed format to another. The converted media content is sent via an IP network 60 provided by a public Internet or a private IP backbone of an ISP 100, and routed to the platform 74 for switching and routing to a selected optimized ISP network 100 for delivery of the content. The platform 74 may include an iEDP switch (i.e., a layer 2 or layer 3 switch) for switching IP traffic based on a route plan generated by a Route Optimizer (as more fully described below), and an Application Server for performing certain value-added services (e.g., using a high quality codec to compress the high definition video content while maintaining high fidelity of the content and streaming it to multiple parties) as desired by the subscribers. Additional downstream gateways 76 may also be provided to convert the multimedia content to an appropriate format of the networks of the receiving access devices 72 of the called parties. Since the system is capable of bidirectional communication (e.g. video conferencing), this process may be repeated in the upstream direction when users of the receiving access devices 72 transmits multimedia content to other parties connected in this call session.

A more detailed description of the servers on the platform 74 is provided below.

a. Media Servers

Once the platform 74 determines that the intended access devices 72 are available, the call or media session is set up, and the access device 72 is directed to begin sending multimedia content to the receiving access devices 72. If, according to the Registrar Server, the access device 72 requires a different media format, a media server will be directed to reformat the media content from the transmitting access device 72 and convert it into one that is compatible with the receiving access device 72 and host network. It may be further instructed to take the stream from the originating party and direct it to all connected parties such that all receiving parties in a manner that may be referred to as multicast (except the platform creates a bidirectional streaming). The platform 74, upon receipt of the multimedia stream from the transmitting access device 72, will process and direct one or more streams to one or more of the access devices 72. A bidirectional or duplex communication occurs when the receiving access device 72 also transmits multimedia content to the original transmitting access device 72 and any other access devices 72 in the same call session. In effect, the platform 74 has established a video-conference for the multiple devices.

In the event the access device 72 is connected to a circuit switched network 68, the media application server converts between real-time transport protocol (RTP) in the IP network 60 to the pulse code modulation (PCM) in the circuit-switched network 68 and transcodes the media content when the codecs of the networks do not match or are otherwise incompatible.

b. Route Optimizer

The platform 74 preferably includes a Route Optimizer that identifies the best-suited route to transport the multimedia content by, for example, pre-testing available routes offered by multiple internet service or backbone providers. The pre-testing may include penultimate hop router testing as described in detail below. Using the results from the route testing, the Route Optimizer constructs a route plan for routing traffic based on characteristics of the multimedia content to be transmitted corresponding to the access device registered in the subscriber registry. For example, a phone with video capabilities will send audio/video content encoded in a specific format and would require networks with low latency and low jitter and the Route Optimizer would find a network path from its Route Plan that provides, for example, less than 100 ms from starting point (i.e. the calling party) to end point (i.e. the called party) for this phone. For another example, a cell phone without video capabilities will not need as high quality as that required by a video phone. For yet another example, a Blackberry™ phone sending out an email or text message can make use of a low quality IP network for transmission of such content.

3. Quality of Service—Penultimate Router Testing

Figure 15:
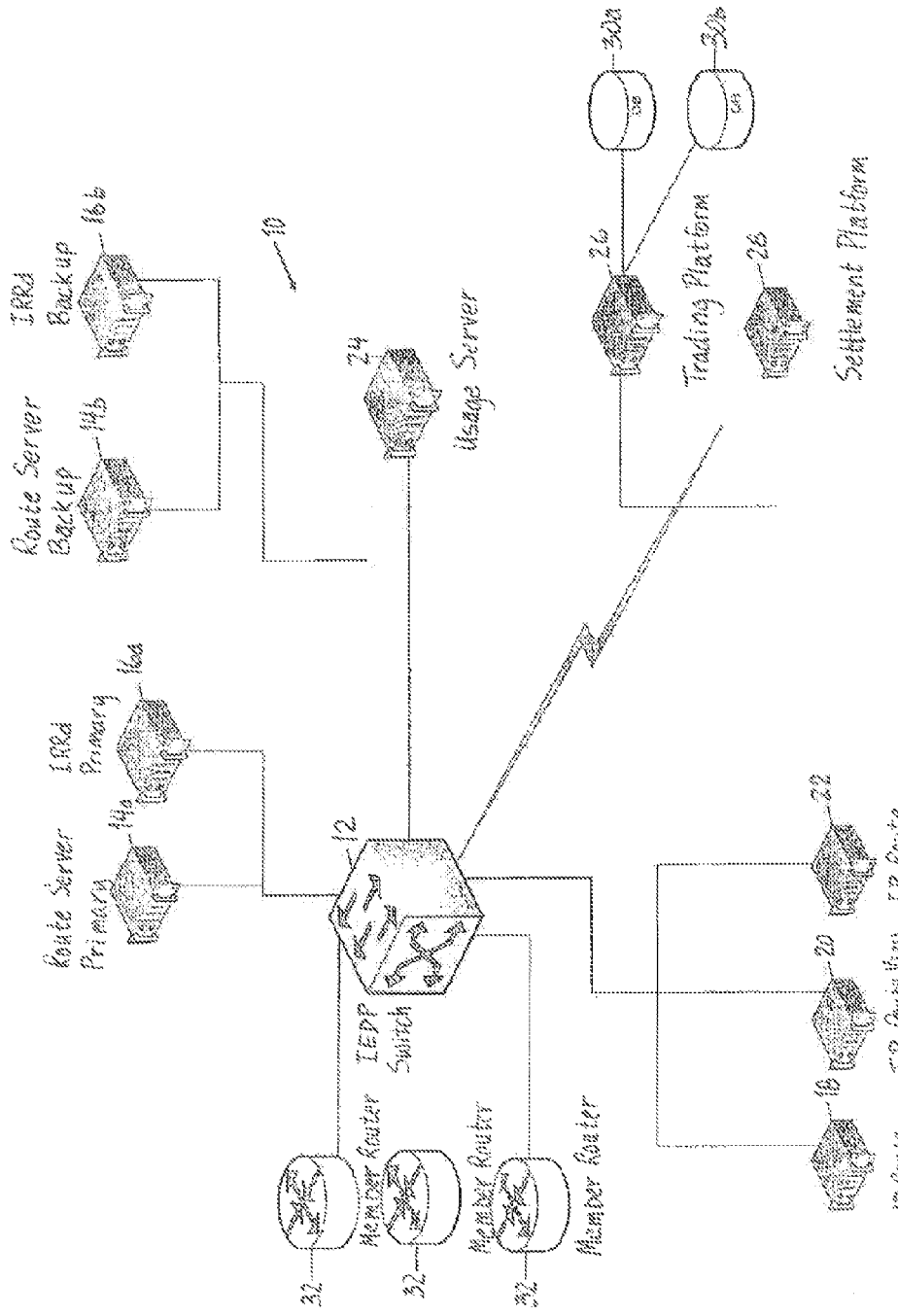
FIG. 15 is a system for performing penultimate router testing.

FIG. 15 depicts a system for performing penultimate router testing in an IP Exchange System 10 according to the present invention, which includes an IP Exchange Delivery Point (iEDP) switch 12 (i.e., a Layer 2 or 3 switch) connected to a trading platform 26 for receiving buy and sell orders from members of the exchange and a settlement platform 28. The trading platform 26 is connected to a buy/sell order database 30a and a quality database 30b. Primary and secondary route servers 14a, 14b and primary and backup route registries 16a, 16b are also connected to the iEDP switch 12. An IP route optimizer 18, IP route view server 20, and IP route database 22 are also connected to the iEDP switch 12. The IP route optimizer 18, IP route view server 20, and IP route database 22 comprise part of a route analyzer discussed in more detail below and may comprise different portions of a single element or may comprise three separate elements as shown in FIG. 15. A usage server 24 is also connected to the iEDP switch 12 to monitor usage of the traded routes. Each member includes at least one member router 32 connected to the iEDP switch 12 through which IP capacity routes are announced for sale by seller, or through which bids are transmitted for IP capacity by buyers.

Figure 16:
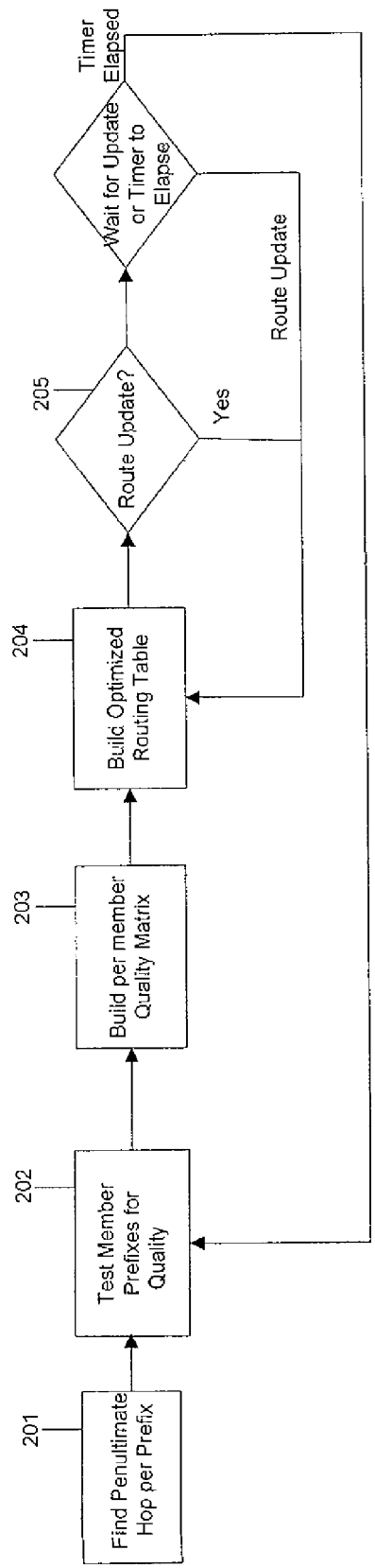
FIG. 16 is a flow diagram of the basic steps of the quality measurement method.

According to the invention, a quality analysis is performed to determine a quality score for connectivity to each IP network prefix announced for sale by a member, so that if a member announces 20,000 IP network prefixes to the exchange for trading, the system returns 20,000 quality scores for that member. This requires the quality measuring system to scan each IP network prefix for its quality. The inventors of the present invention have discovered that the penultimate hops, and not the end points of the Internet, may be tested to determine the quality level of an endpoint. To do this, the inventive system takes in a full view of the Internet (full routing table of all unique IP network prefixes announced into the Internet), in relation to the IP network prefixes announced to the exchange for trading. This can be achieved by receiving a view from a route-view on a public route server, or some private route server that contains all of the IP network prefixes announced publicly to the Internet for routing. Alternatively, a private peering session may be conducted with each member where their route announcements can be received and processed for further internal propagation. At this point the system will need to sort all of the IP network prefixes to find the smallest publicly announced components. Thereafter, as shown in FIG. 16, the system performs a traceroute to each IP network prefix of the smallest publicly announced components and records the penultimate hop for that traceroute, step 201. Once a list is created of all the penultimate hops for each IP network prefix, the system will then quality test these devices, step 202. The score resulting from the quality test as well as what IP network prefixes are associated with that device are compiled into a member quality matrix database for future reference, step 203, and optimized routing tables are generated from the member quality matrix database, step 204. The optimized routing tables are updated in real-time as BGP announcements and withdrawals are received from the members, step 205. Steps 202-205 are repeated at predetermined time intervals, such as every hour, per member, step 206. Steps 201-206 may be performed by the IP route view server 20 of the route analyzer.

In order to reduce what is needed to be monitored for quality, the system will need to find the penultimate hop for each /24 (The /24 is the smallest publicly announced component of the public IPv4 Internet). This allows 2-3 billion testing points to be reduced to 100-400 k testing points. There are two ways to find these penultimate hops, once we have a full view of all IP network prefixes announced for the Internet. One would be to find the penultimate hops through each member, and another would be to use either a third party transit provider or another member that offers full transit. The reasoning for the first solution is that some end points may be multi-homed, and the system will miss different paths to those /24s. This could make a /24 look worse if the only path that is taken is the one least preferred by that end ISP controlling the IP network prefix.

To do this makes for a more accurate quality measurement, but it also adds a large amount of complexity to the system. This would cause multiple penultimate hops for specific /24s, and force the system to try and test both paths and figure out a fair way to combine the scores to give a useful quality score. In the preferred embodiment, one or more transit providers, who may be members or third parties, will be used to find the penultimate hop for each IP network prefix. This process should be done periodically (e.g., once a day).

Figure 17:
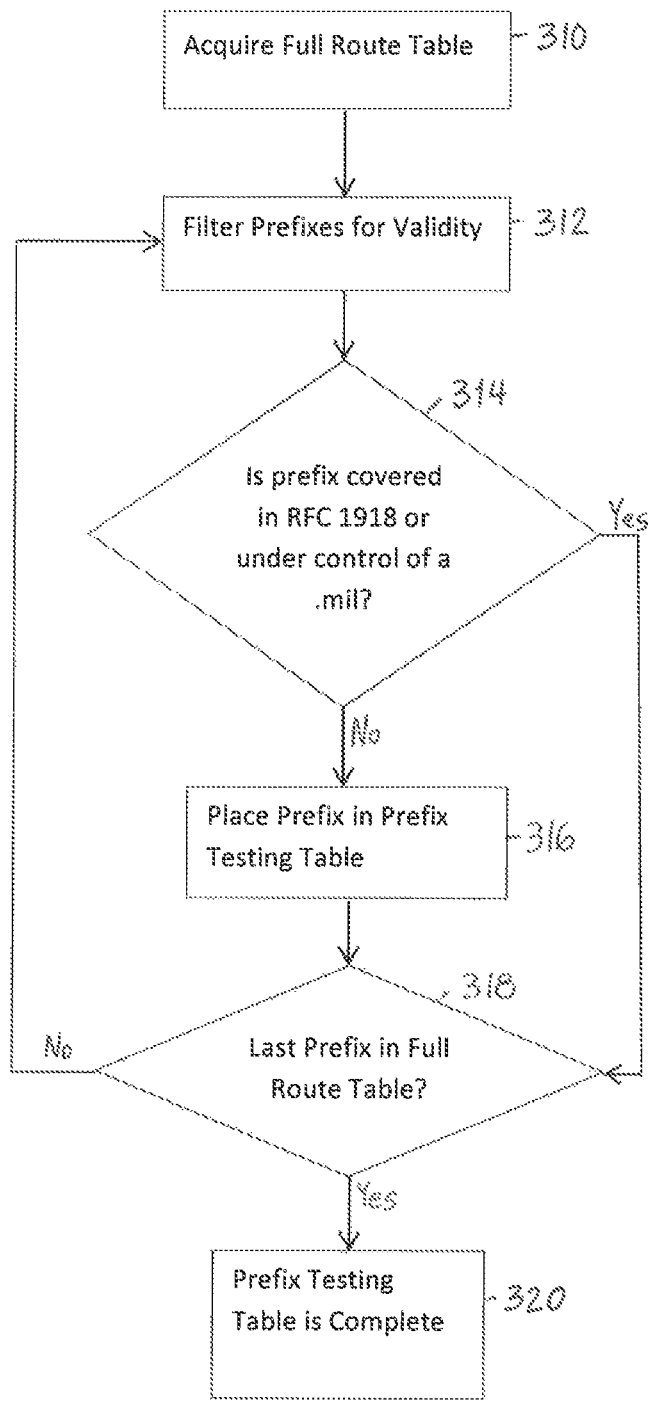
FIG. 17 is a flow diagram of the steps for determining useful IP network prefixes.

Initially, a full route table consisting of the union of the route tables from all (or a subset) of the members is retrieved and filtered to determine the useful IP network prefixes for testing. This process is shown in FIG. 17. First, the full route table is acquired, step 310. The IP network prefixes are then filtered for validity, step 312. Each valid IP network prefix is then checked to see if it is exempt as part of a private network under RFC 1918 or under control of a military (.mil) IP address allocation or found on a list of blocks to exclude, step 314. If it is not exempt, the IP network prefix is added to an IP network prefix testing table, step 316. Steps 312-316 are repeated for all IP network prefixes in the full route table, step 318. In step 320, the prefix testing table is complete, and the information can be represented in the following table format.

TABLE 1

Full Route Table Prefix List

| Member ID | Prefix/mask | AS Path |
| --- | --- | --- |
| 1.1.1.1 | 10.0.0.0/8 | 701 18637 1 |

Figure 18:
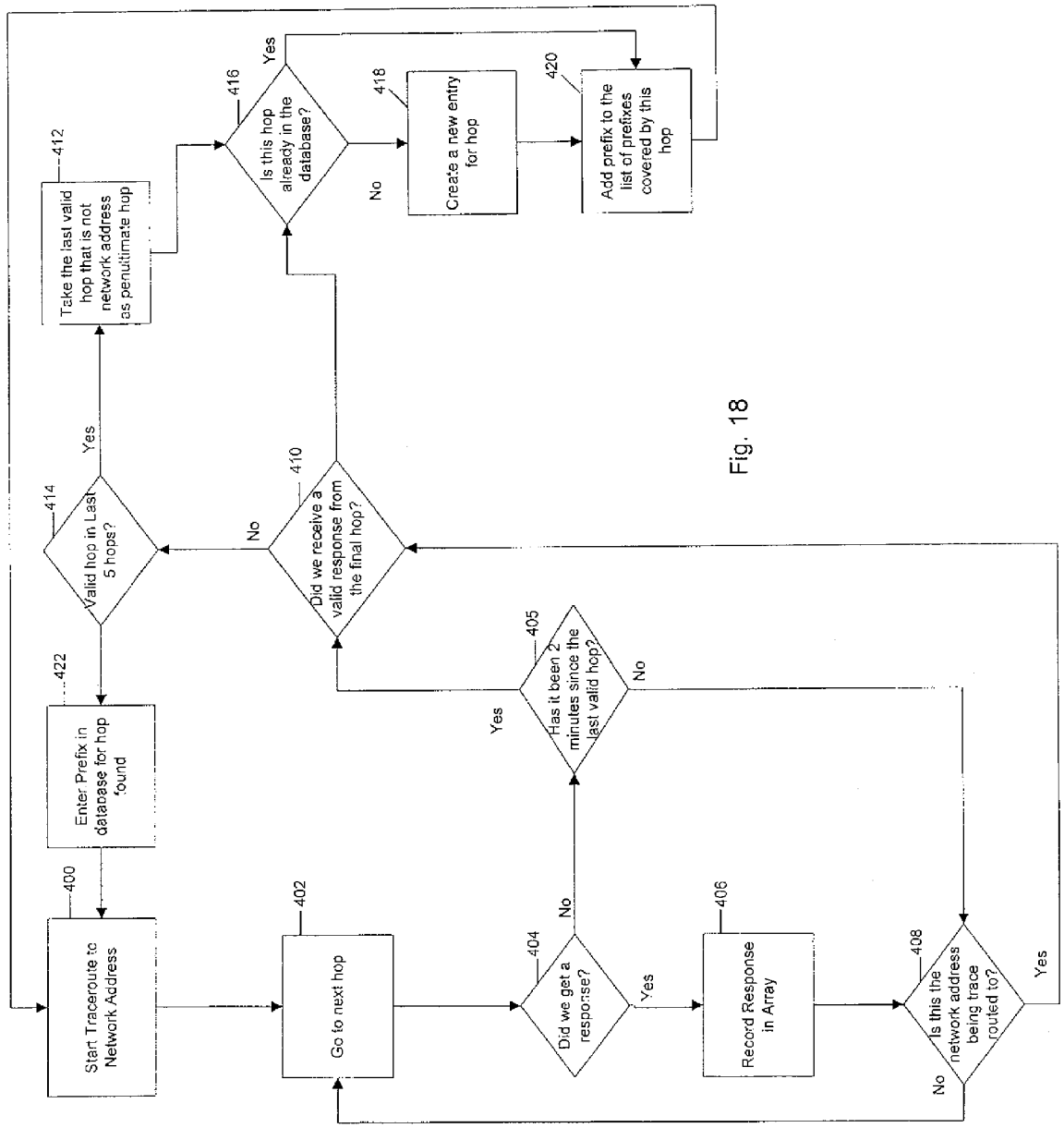
FIG. 18 is a flow diagram of the steps for finding the penultimate hop router for each IP network prefix to be tested.

The process of finding the penultimate hop is shown in FIG. 18. Preferably, multiple penultimate hop detections are run simultaneously in parallel. To find the penultimate hop for each prefix/mask on the IP network prefix testing table, the process runs a traceroute to the network address of each prefix/mask, step 400. The network address of the prefix/mask is tested because this is considered acceptable Internet traffic and does not set off firewall alarms or intrusion detection alarms (IDS) alarms. Real-world testing has shown that the device which responds to the network address has a very high correlation to the device which would be derived from testing individual hosts (/32s). This will find the path to the network of the prefix/mask via the supplier of transit, and give an IP Address of each hop as it encounters them, step 402. If some part of the path is filtered, doesn't allow traceroutes to access that router or further, or some part of the path is down, the traceroute will return with a failure to reach the next hop, step 404. After a failure to reach a next hop, a timer is started which times out after a predetermined time period, i.e., two minutes, step 405. If a response is received, the response is recorded in an array, step 406. The process then determines whether the last hop is the network address that is being tracerouted, step 408. If it is not, step 402 is repeated. If the last hop is the network address, the process determines whether a valid response was received from the final hop, step 410. If no valid response was received from the last hop in step 410, or if there is a valid hop in the last five hops, step 414, the last valid hop is taken as the penultimate hop, step 412. If there is no valid hop in the last five hops, the IP network prefix is entered into the database with an entry stating "no penultimate hop found", step 422. The process determines if the penultimate hop determined in step 412 or 414 is already in the database, step 416. If the penultimate hop is not already in the database, a new entry is made for this device, step 418. The prefix/mask of the IP network prefix being tracerouted is then added to the list of prefix/masks covered by this penultimate hop, step 420.

Once all of the IP network prefixes in the table have been used to find their penultimate hop, the system may consolidate each router's list of /24s into the most efficient CIDR block to facilitate searching in later phases of the quality measurement system. Each entry is stored in a database in Table 2.

TABLE 2

| Penultimate Hop Database Format | |
| --- | --- |
| Penultimate Hop | IP network prefixes under Penultimate Hop |
| 205.198.3.2 | {3.0.0.0/8, 204.157.0.0/16, 199.0.216.0/24} |

Figure 19:
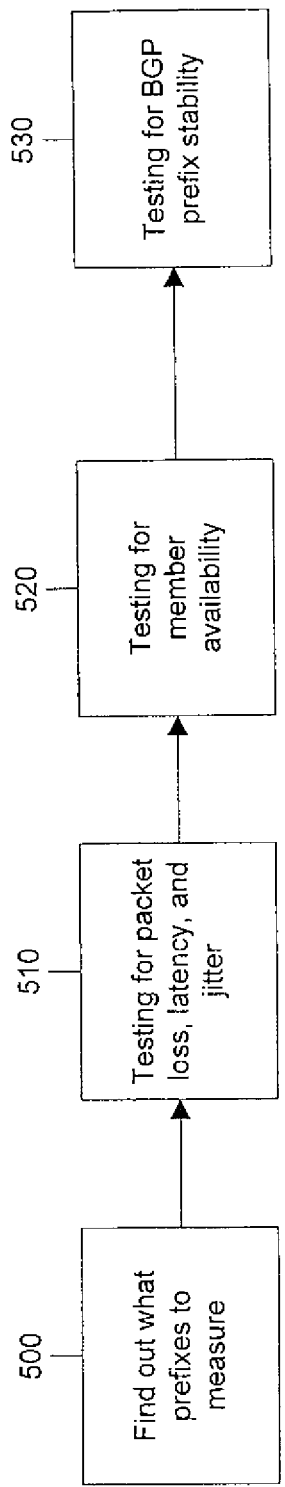
FIG. 19 is a flow diagram of the basic testing steps for each of the IP network prefixes.

FIG. 19 is a flow diagram showing the steps for testing the quality of the penultimate hops. The first step for testing the penultimate hops is to determine what IP network prefixes to measure, i.e., relevant to what endpoints are announced as for sale on the trading exchange, step 500. The quality measurements to be measured consist of network parameters such as, for example, packet loss, latency, jitter, member availability and BGP stability. This splits the measuring process into three parts. At step 510 the penultimate hop is tested for packet loss, latency, and jitter, at step 520 the penultimate hop is tested for availability, and at step 530 the penultimate hop is tested for BGP stability. The idea behind something other than just packet loss and latency is to get more granular and realistic information about on the actual or "real world" quality of that route. Jitter provides a metric for determining how stable the latency values are (high jitter can indicate queuing bottlenecks on the path). BGP stability is required to form a good understanding of what that announced IP capacity does. If the announced IP capacity is injected then recalled several times a day, there is a good chance the path the system hears that from is unstable. All of the above-described quality testing should be performed periodically (at least once per hour per member).

Figure 20:
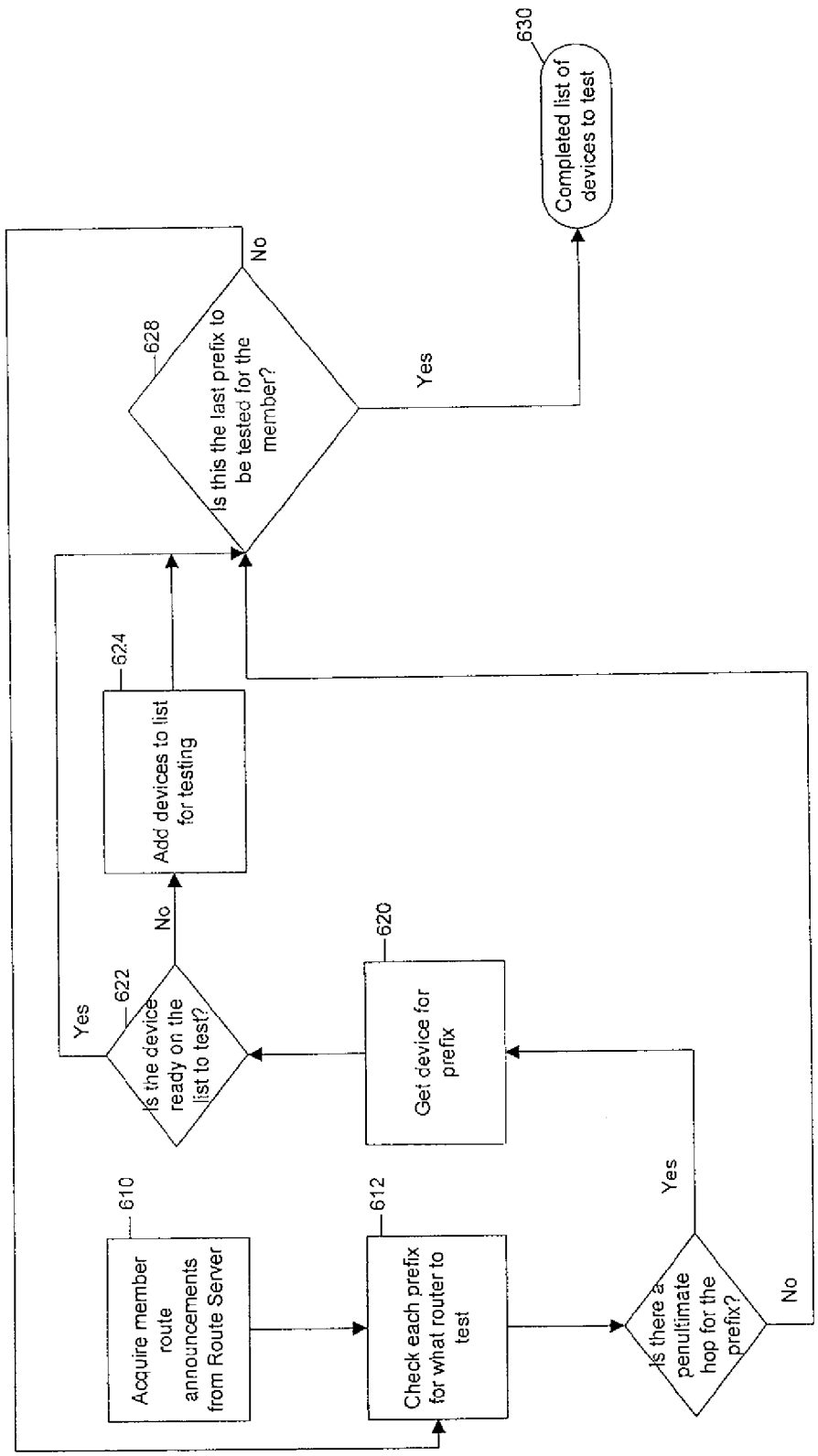
FIG. 20 is a flow diagram of the steps for determining which routers to test.

Even though we have a list of all the end routes in the Internet, we require quality information only for those endpoints that have been announced to the trading exchange, i.e., only the endpoints that are on sale. FIG. 20 is a flow diagram showing the steps for determining which routers to test. At step 610 the member route announcements are retrieved from the Route server 14 (see FIG. 15). Each IP network prefix in the member route announcements is checked to determine which penultimate hop to test, step 612. Since the IP network prefixes are stored in their most efficient CIDR block, step 614 determines if there is a penultimate hop listed for the IP network prefix. If not, the IP network prefix is skipped and the system goes to the next prefix, step 616. If the IP network prefix is listed under its current form under a penultimate hop, the penultimate hop is retrieved at step 620. The process determines whether the penultimate hop is already on the list of penultimate hops to test, step 622, and adds the penultimate hop to the list if it is not already there, step 624. Step 628 determines whether the last IP network prefix is tested. The completed list of penultimate hops is then sent to be tested in step 630.

Figure 21:
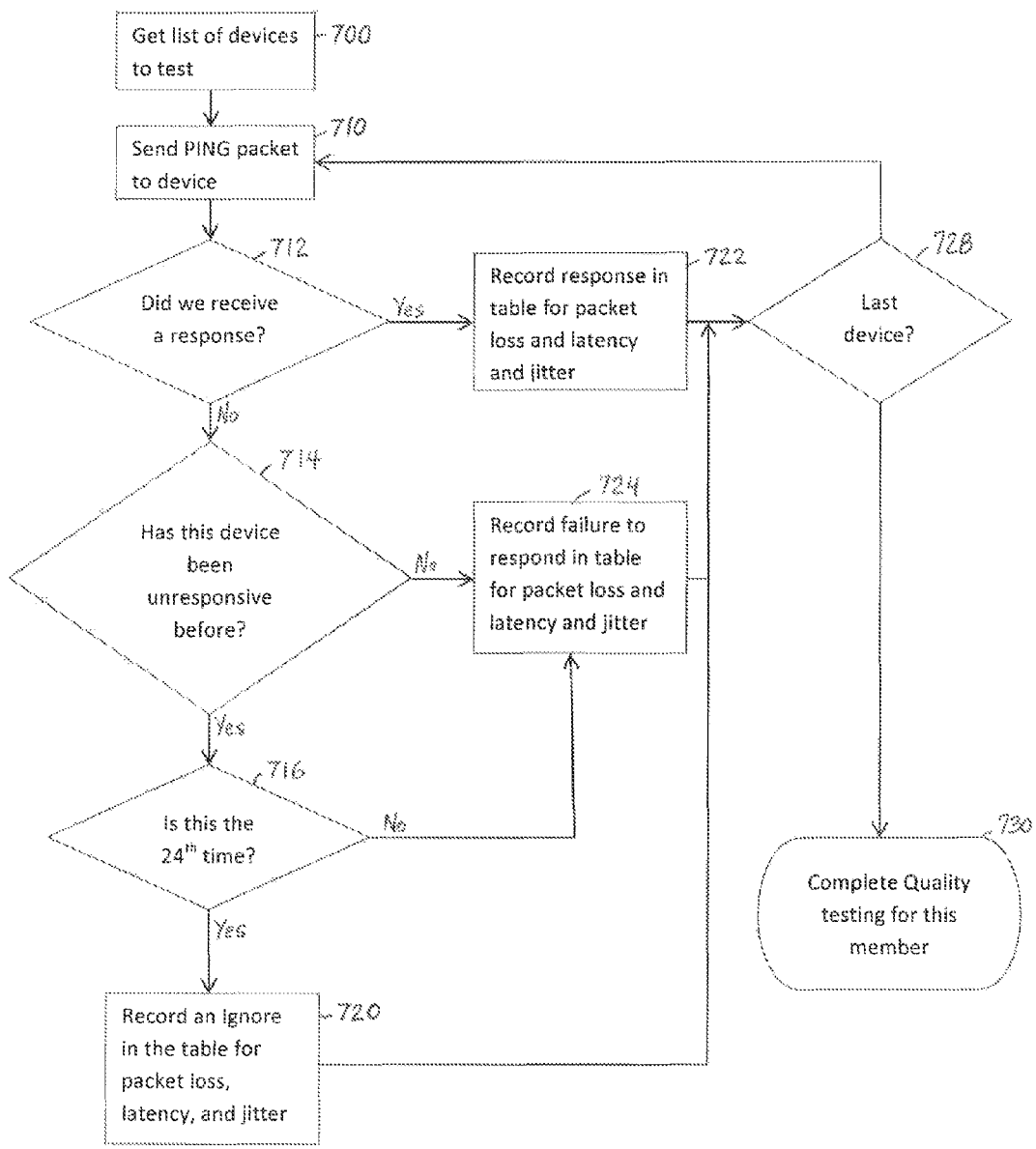
FIG. 21 is a flow diagram of the steps for packet loss and latency testing.

FIG. 21 shows the steps for testing packet loss, latency, and jitter. The system determines the list of penultimate hops to test, step 700, and sends an ICMP or UDP ping packet to each penultimate hop in the list for that member, step 710. As stated above, the testing is performed periodically, i.e., every hour, to allow visibility of the peaks and valleys in a member's traffic pattern. At step 712, the process determines whether a response is received. The problem with a ping test is that some devices will filter it out. Even if TCP is used instead of UDP or ICMP, the penultimate hop may still fail to issue a response. This causes some IP network prefixes to indicate a false 100% loss or null information (if that data is discarded). If this persists, then this penultimate hop and the IP network prefixes it represents will need to be taken out of the equation when computing packet loss for any ASN that is traded from this member. If no response is received, step 714 determines whether the penultimate hop device has been previously unresponsive. Step 716 determines whether it has been unresponsive for more than 24 times (i.e., 24 hours). If the penultimate hop device is unresponsive for 24 times or more, the device should be marked as an IGNORE in the Packet Loss, Latency, and Jitter columns in the table, step 720. If unresponsive for less than 24 times, the failure is recorded in the table, step 724. If a response was received in step 712, the responses are recorded in the table, step 722. If the penultimate hop is not the last penultimate hop in the list, a ping packet is sent to the next penultimate hop on the list, step 710. The ping packet of step 710 is sent several times (i.e., ten times) in quick succession to obtain more than a single snapshot view of the packet loss, latency, and jitter at that point in time. If the penultimate hop is the last penultimate hop on the list, the quality testing for the penultimate is completed as described below, step 730. Table 3 shows the format that may be used to store the response to the ping packet.

Packet loss is stored as a percentage. A "0%" indicates that there were no packets lost, and "100%" indicates that all of the packets were lost. Latency is the ms Round Trip Time (RTT) for the ping packet. Jitter is the difference between various measurements of latency, wherein a lower measurement indicates a more consistent latency.

TABLE 3

| Member Packet loss and Latency format | | | | | | | | |
| --- | --- | --- | --- | --- | --- | --- | --- | --- |
| Member ID | End Router | Prefixes under End Router | Packet Loss | Latency (ms) | Jitter (ms) | Member Port Online | # of Times Announcements were cycled | Time Stamp |
| 1.1.1.1 | 205.198.3.2 | {3.0.0.0/8, 204.157.0.0/16, 199.0.216.0/24} | 0 | 40 | 5 | | | |

Testing availability of a router may be achieved relatively easily. All that needs to be done is to check the port on the iEDP switch 12 (see FIG. 15) via Simple Network Management Protocol (SNMP) to verify that the port is either up or down. The following is an example of a Management Information Base (MIB) required for this:

.1.3.6.1.4.1.1991.1.1.3.3.1.1.9.

Testing the availability of the router may be done as one large batch to get the current status of all members' ports and then add them to the quality table in the availability column. If the port is online, it may be designated as "1" in the database. If the port is down, it gets a "0" designation. Availability may also be derived from 100% packet loss for all pings to a member, as well as from accessing the port status by telnet or by other methods.

Testing is also performed for the stability of an IP network prefix. If the IP network prefix is injected and removed many times an hour, then there may be some issue with it, or there may be some strange policies associated with it. This modifies the quality of the ASN you are getting if parts of those controlled IP network prefixes are unstable. To determine stability of a route, a log of all the IP network prefixes that this member has injected and removed from the route server is acquired. This is done by parsing the log file specifically for this task that the Route Server exports and appends each time a BGP route change happens. The easiest way for this to be done would be to run the following script per IP network prefix:

cat<logfile>|grep<IP network prefix>|wc -/.

The results may be stored in the quality table in the BGP stability column.

Figure 23:
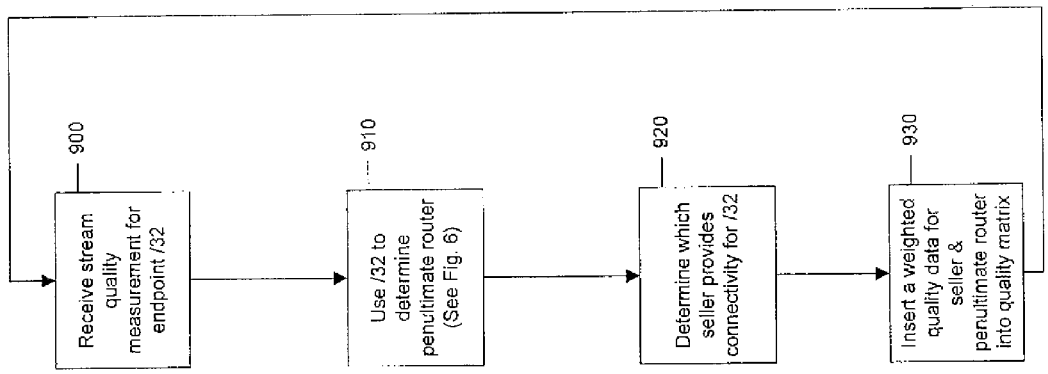
FIG. 23 is a flow diagram showing the steps for augmenting quality metrics with externally collected performance information.

FIG. 23 shows the steps for augmenting the quality measurements with complementary data received from external sources (for example, streamlining audio or video real-time quality information) and updating the packet loss, latency, and jitter. The system receives the additional quality information for a /32 endpoint IP address, step 900. The system then determines the IP network prefixes which contain the /32 and determines the penultimate router, step 910. It is then determined from the full route table which provider is providing the connectivity to the /32 end point IP address, step 920. The full route table is available to the quality server, allowing it to determine what route the streaming video server is using to reach the endpoint IP address. The new quality information is added to the available quality information for the endpoint, and used to update the quality information for the IP network prefix.

Once all of the testing for a router as shown in FIG. 16 is completed, a member quality matrix table should be constructed or updated that lists the entire set of IP network prefix scores for each member. This will be used by the matching engine of the trading platform 26 (see FIG. 15) to sort buy and sell trades by the quality of the ASN being traded. The member quality matrix table may be accessible from another machine within the LAN, but does not need to allow write permissions. The member quality matrix table may be output as a comma-delimited file that has all of a members IP network prefixes with the grades as exemplarily shown in FIG. 22. There would be a file for each member every hour. The file is downloadable by the matching engine of the trading platform for use and storage.

From the member quality matrix table, one or more optimized routing tables may be built. The idea is to take, for each buyer, a full route view and compare it with all of the routes that are announced by any member who wishes to participate and meets the buyer's price bids and other qualifications. For each IP network prefix in the full route table, the system chooses the best quality IP network prefix route from the available routes from qualifying members. This is performed by the IP route optimizer 18. It does this for each IP network prefix in the table, creating a new, optimized route table which is saved in the IP route database 22. This new optimized route table is transmitted to the Route Server for use by one or more members. The table is created for each member, according to their bid options. The formula used for the quality comparison can be customized to the traffic type of the customer (VoIP vs. bulk data)

The choice for quality by default follows this priority list, with ties going to the next step down:

1. Lowest score in packet loss,
2. Lowest score in latency,
3. Lowest score in jitter,
4. Highest score in availability
5. Highest score in BGP Stability,
6. Follow conventional BGP rules.

Other formulas are possible and can be modularly updated.

C. Operation

Figure 24:
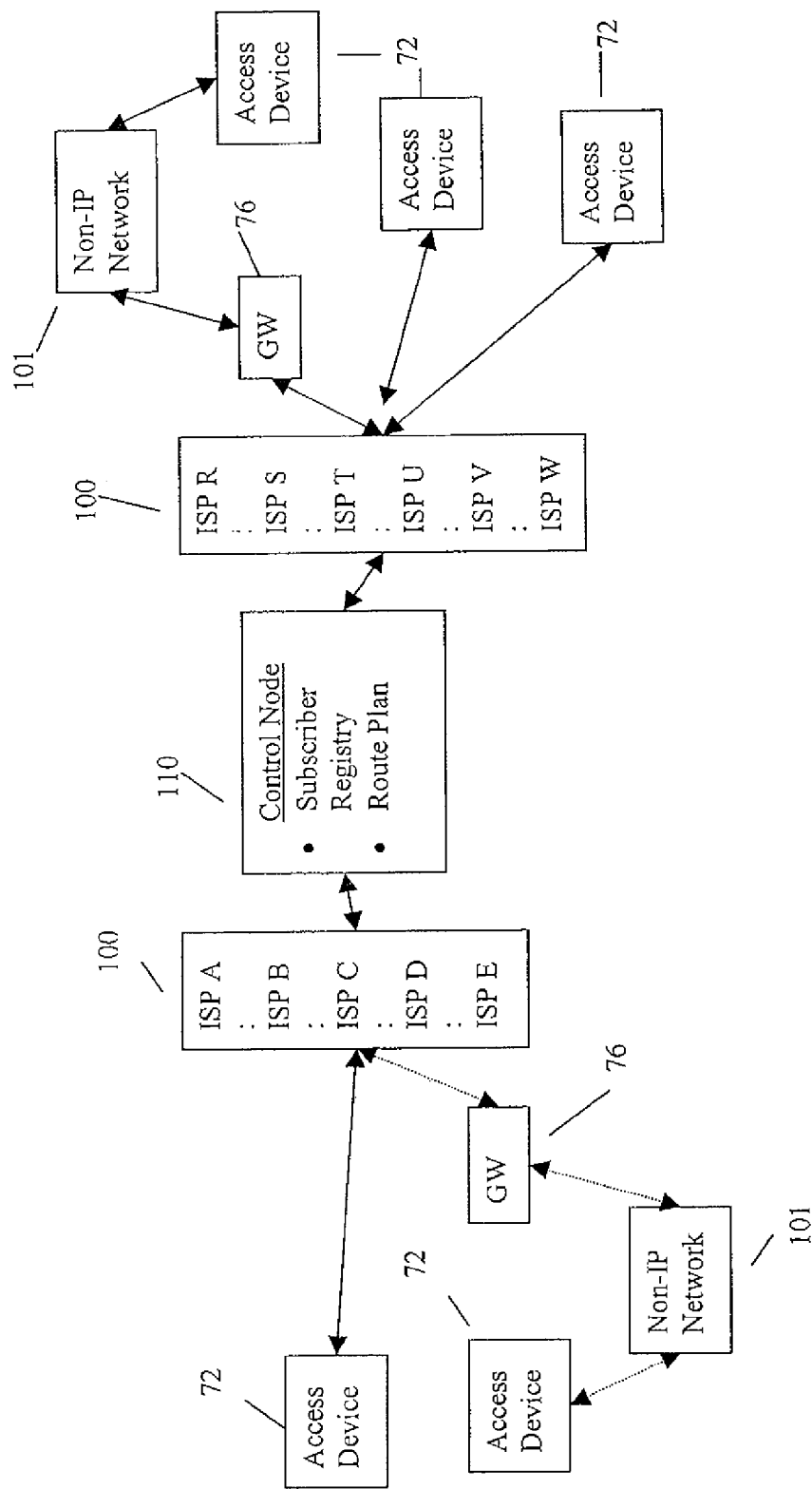
FIG. 24 illustrates the calling and called parties engaged in bidirectional multimedia communications.

FIG. 24 shows a control node 110 that manages the multimedia communications among the various access devices 72. The control node 110 optimizes the IP routes offered by the various ISPs 100 and creates a route plan based on the measured performance characteristics of the IP routes. The route plan may categorize different routes suitable for certain multimedia content based on performance characteristics of the multimedia content and/or quality of service available to the subscribers based on their subscription plans stored in the Subscriber Registry. The route plan may be updated periodically as the IP routes may become unavailable or congested during different periods of times.

The originating access device 72 may be able to contact the control node 110 directly if it is configured as a SIP user agent and connected to the Internet. Otherwise, the access device 72 sends call setup messages through a non-IP network and a gateway 76 and then via ISP 101 to the control node 110. If the access device 72 is connected to a non-IP compatible network such as a GSM network, the access device 72 may initiate call setup through, for example, a pre-installed client application on the access device 72, to contact the control node 110. In such case, the call setup message will be converted at a gateway 76 and forwarded by a redirect/proxy server to the control node 110. Once the control node 110 sets up the call or media session with the desired subscribers, the service is delivered in the aforementioned manner.

Figure 25:
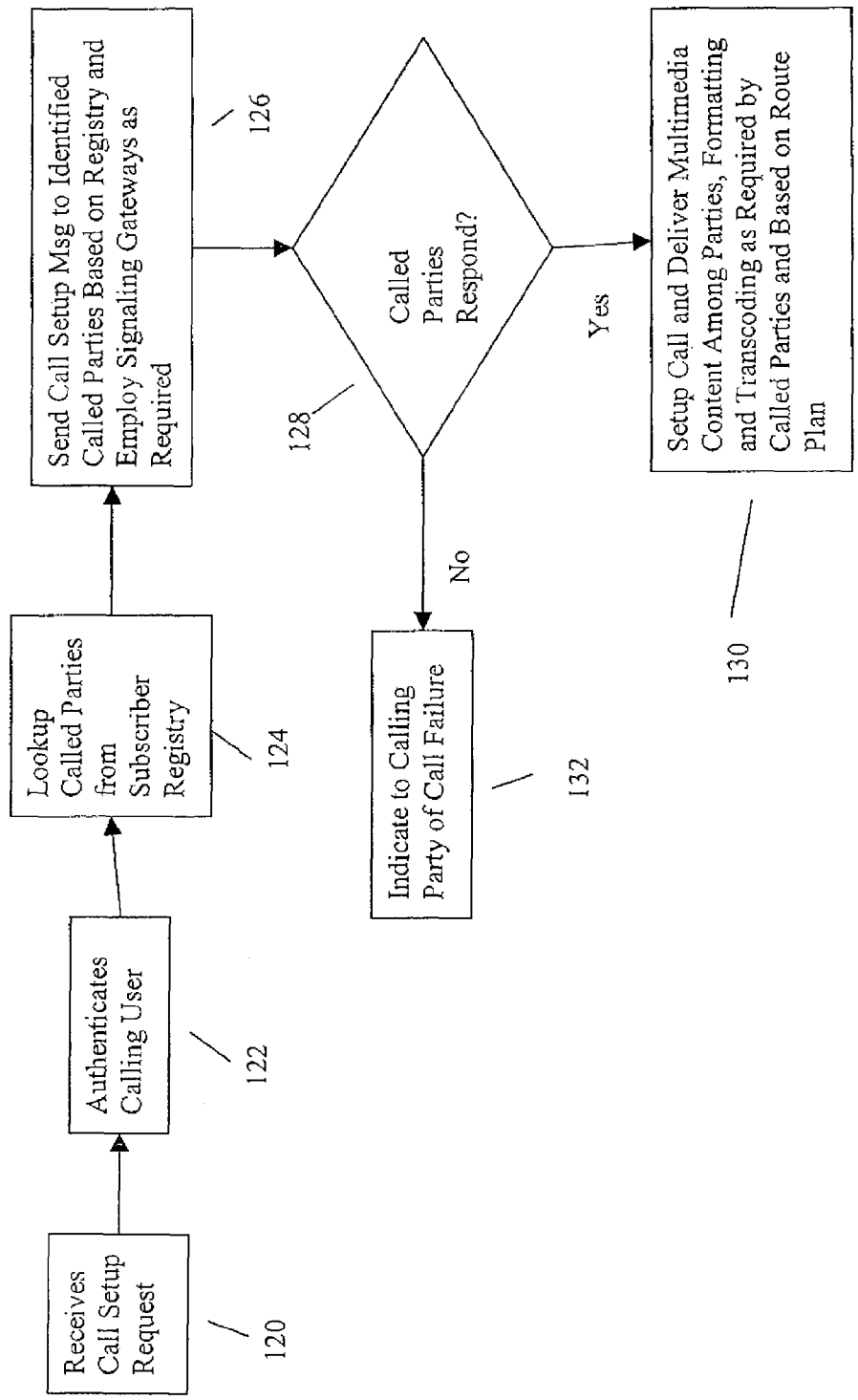
FIG. 25 diagrammatically illustrates the call setup procedure in accordance with the invention.

FIG. 25 shows a flow chart of an exemplary operation of an embodiment of the present invention. In Step 120, the control node 110 receives a call setup request. In Step 122, it performs authentication of the call request by verifying the status of the calling subscriber in the Subscriber Registry. Failure to authenticate will result in a failed call attempt. If authenticated, the control node 110 looks up the Subscriber Registry for the called parties information in Step 124. If the Subscriber Registry includes valid called parties information, the control node 110 sends Call Setup Message(s) to the identified called parties based on their registered information (including sending call setup messages to the preferred access device and if unsuccessful to the other devices in a previously specified order) in Step 126. The control node 110 determines if the called parties respond in Step 128. If the called parties' access devices respond, a call or media session is setup for the parties and service is delivered using the route plan generated by the control node 122 in Step 130. In Step 132, if the called party's access devices 72 do not acknowledge the call setup requests, the control node sends messages to the originating access device 132 indicating call setup failure.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for communication between two access devices via one or more networks, comprising the steps:
receiving a transmission in a first format through a first communication network from a first access device of a calling party, the transmission comprising a signaling message for one of establishing and transmitting voice communication for a phone call in one of a digital telephone network, an analog telephone network, and a cellular network from the calling party to a called party;
performing a first conversion converting the transmission from the first format to a second format, the second format being Internet protocol (IP);
sending the converted transmission through a second communication network, the second communication network being a data network, for reception by a second access device of the called party,
performing a second conversion further converting the converted transmission from the second format to a further format suitable for the second access device,
wherein each respective one of the first access device and the second access device comprises one of a telephone, a pager, a cellular phone, a laptop, a facsimile machine, and a multimedia workstation and said further format comprises said first format or another telecommunication protocol, and
optimizing routing of a multimedia communication between access devices, the optimizing including:
determining, by a control node, a quality of each IP network of a plurality of IP networks connected to the control node;
creating, by the control node, a quality matrix including the determined quality for the each IP network;
setting up, by the control node, a media session between an originating access device and a receiving access device across a plurality of communications networks having different communications protocols including Internet protocol (IP); and
upon successful setup of the media session, routing by the control node the multimedia communication between the originating and receiving access devices along a select path through at least a portion of one of the IP networks based on the quality matrix.

2. The method of claim 1, wherein the transmission is sent from the first access device serially to a first central node, the data network, a second central node, and the second access device.

3. The method of claim 1, wherein the first communication network is one of an analog telephone network, a digital telephone network, a cellular network, WiFi network, WiMax network, LTE network, and satellite system.

4. The method of claim 1, wherein a calling party is connected to the first access device for transmitting and receiving voice communication for a phone call and a called party is connected to the second access device for transmitting and receiving the voice communication for the phone call.

5. The method of claim 1, further comprising the step of selecting a route for the transmission based on at least one criteria defined by user preference.

6. The method of claim 5, wherein the at least one criteria comprises a specified level of transmission quality.

7. The method of claim 5, wherein the at least one criteria comprises credit availability of a calling party.

8. The method of claim 5, wherein the at least one criteria comprises cost of routing.

9. The method of claim 1, wherein the transmission comprises execution of at least a part of a call setup procedure.

10. The method of claim 1, further comprising the step of storing at least one of subscriber information, rate schedules, and call details.

11. The method of claim 1, further comprising a second conversion from the second format to a further format suitable for the second access device.

12. The method of claim 11, wherein the further format comprises said first format or another telecommunications protocol.

13. A system for transmitting communications between two access devices, the system comprising:
a first node accessible by a first access device of a calling party using a first communication network,
said first node being a telecommunication node configured to receive a transmission in a first format from the calling party through the first network, the transmission comprising a signaling message for one of establishing and transmitting voice communication for a phone call from the calling party to a called party; and
a first converter converting the transmission from the first format to a second format, the second format being an Internet protocol (IP),
said first node being further configured to transmit the converted transmission through a second communication network to second node capable of connecting to a called access device of the called party, the second node having a second converter converting the transmission from the second format to a further format suitable for the second access device, said further format comprising said first format or another telecommunication protocol, and
a control node for optimizing routing of a multimedia communication between access devices, the control node configured to determine a quality of each IP network of a plurality of IP networks connected to the control node, create a quality matrix including the determined quality for the each IP network, set up a media session between an originating access device and a receiving access device across a plurality of communications networks having different communications protocols including Internet protocol (IP), and upon successful setup of the media session, route the multimedia communication between the originating and receiving access devices along a select path through at least a portion of one of the IP networks based on the quality matrix.

14. The system of claim 13, said first node further comprising means for receiving voice communications initiated by the called party from the data network and converting the received voice communications from said first format to said second format.

15. The system of claim 13, said first node further comprising a server for connecting the first node to the data network and a telephone server for connecting the node to the one of a digital telephone network, an analog telephone network, and a cellular network.

16. The system of claim 15, wherein the telephone server comprises a Public Switched Telephone Network Interface.

17. The system of claim 13, wherein the first node is further configured to select a route to the called party based on at least one criteria of user preference.

18. The system of claim 17, wherein the at least one criteria comprises a specified level of transmission quality.

19. The system of claim 17, wherein the at least one criteria comprises credit availability of a calling party.

20. The system of claim 17, wherein the at least one user criteria comprises cost of routing.

21. The system of claim 13, wherein the transmission comprises execution of at least a part of a call setup procedure.

22. The system of claim 13, wherein said converter effects a second conversion from the second format to a further format suitable for the called access device.

23. The system of claim 22, wherein the further format comprises the first format or another telecommunication protocol.

24. The system of claim 13, wherein said first communication network comprises one of a digital telephone network, an analog telephone network, and a cellular network.

25. The method of claim 1, wherein the transmission consists of a signaling message including an identification number of the called party.

26. The method of claim 1, wherein the transmission further comprises a voice component, wherein the voice component of the transmission is converted into a format suitable for the data network or another data network, sent using the data network or the another data network, and reconverted to voice transmission prior to reaching the called party.

27. The system of claim 13, wherein the transmission consists of a signaling message including an identification number of the called party.

28. The system of claim 13, wherein the transmission further comprises a voice component, wherein the voice component of the transmission is converted into a format suitable for the second communication network or a further data network, sent using the second communication network or the further data network, and reconverted to voice transmission prior to reaching the called party.

29. The method of claim 1, wherein the transmission consists of a signaling message including an identification number of the calling party.

30. The method of claim 1, wherein the transmission consists of a signaling message including identification numbers of both the calling party and the called party.

31. The system of claim 13, wherein the transmission consists of a signaling message including an identification number of the calling party.

32. The system of claim 13, wherein the transmission consists of a signaling message including identification numbers of both the calling party and the called party.

\* \* \* \* \*